United States Patent
Noh et al.

(10) Patent No.: US 11,481,146 B2
(45) Date of Patent: Oct. 25, 2022

(54) STORAGE DEVICE INCLUDING A BUFFER MEMORY HAVING A COMMON BUFFER FOR STORING OVER-SIZED WRITE DATA, AND OPERATING METHOD THEREOF

(71) Applicant: SK hynix Inc., Icheon (KR)

(72) Inventors: Jung Ki Noh, Icheon (KR); Soon Yeal Yang, Icheon (KR); Tae Jin Oh, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/189,007

(22) Filed: Mar. 1, 2021

(65) Prior Publication Data

US 2022/0066692 A1 Mar. 3, 2022

(30) Foreign Application Priority Data

Aug. 28, 2020 (KR) .......................... 10-2020-0109188

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC ..... G06F 3/0604; G06F 3/0679; G06F 3/0656
See application file for complete search history.

(56) References Cited

U.S. PATENT DOCUMENTS

| 2010/0169542 A1* | 7/2010 | Sinclair | G06F 12/0246 711/E12.078 |
| 2014/0082265 A1* | 3/2014 | Cheng | G06F 12/0246 711/103 |
| 2019/0220416 A1* | 7/2019 | Jung | G06F 12/0246 |
| 2020/0201570 A1* | 6/2020 | Kim | G06F 3/0659 |

FOREIGN PATENT DOCUMENTS

| KR | 10-1083673 B1 | 11/2011 |
| KR | 10-2018-0047402 A | 5/2018 |
| KR | 10-2074329 B1 | 2/2020 |

* cited by examiner

*Primary Examiner* — Mark A Giardino, Jr.

(57) ABSTRACT

A storage device includes a memory device including a plurality of memory areas respectively corresponding to a plurality of address groups each of which includes consecutive logical addresses provided by a host, a buffer memory including a common buffer and a plurality of zone buffers, the plurality of zone buffers respectively corresponding to the plurality of memory areas, and a memory controller for controlling the buffer memory to temporarily store write data corresponding to a logical address provided from the host in one of a zone buffer corresponding to the logical address and the common buffer according to whether a first size of the write data exceeds an available storage capacity of the zone buffer, the available storage capacity representing a size of an empty storage space of the zone buffer in which no data is stored.

20 Claims, 20 Drawing Sheets

FIG. 6

<ZONE BUFFER STATUS INFORMATION>

| Zone # | Data Size | Full | LBA |
|---|---|---|---|
| Zone1_inf | Z1_data_Size | Full_Zone1 | Z1_LBA |
| Zone2_inf | Z2_data_Size | Full_Zone2 | Z2_LBA |
| ⋮ | ⋮ | ⋮ | ⋮ |
| ZoneN-1_inf | ZN-1_data_Size | Full_ZoneN-1 | ZN-1_LBA |
| ZoneN_inf | ZN_data_Size | Full_ZoneN | ZN_LBA |

<COMMON BUFFER STATUS INFORMATION>

| C_data_Size | Full_Common | C_Zone1 | C_Zone2 | ... | C_ZoneN |
|---|---|---|---|---|---|

STORAGE DEVICE INCLUDING A BUFFER MEMORY HAVING A COMMON BUFFER FOR STORING OVER-SIZED WRITE DATA, AND OPERATING METHOD THEREOF

CROSS-REFERENCE TO RELATED APPLICATION

The present application claims priority under 35 U.S.C. § 119(a) to Korean patent application number 10-2020-0109188, filed on Aug. 28, 2020, in the Korean Intellectual Property Office, the entire disclosure of which is incorporated herein by reference.

BACKGROUND

1. Technical Field

The present disclosure generally relates to an electronic device, and more particularly, to a storage device and an operating method thereof.

2. Related Art

A storage device is a device which stores data under the control of a host device such as a computer, a smart phone, or the like. The storage device may include a memory device for storing data and a memory controller for controlling the memory device. The memory device is classified into a volatile memory device and a nonvolatile memory device.

The volatile memory device is a memory device in which data is stored only when power is supplied thereto, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments provide a storage device which provides an improved buffer memory management method, and an operating method of the storage device.

In accordance with an aspect of the present disclosure, there is provided a storage device including: a memory device including a plurality of memory areas respectively corresponding to a plurality of address groups each of which includes consecutive logical addresses provided by a host; a buffer memory including a common buffer and a plurality of zone buffers, the plurality of zone buffers respectively corresponding to the plurality of memory areas; and a memory controller configured to control the buffer memory to temporarily store write data corresponding to a logical address provided from the host in one of a zone buffer corresponding to the logical address and the common buffer according to whether a first size of the write data exceeds an available storage capacity of the zone buffer, the available storage capacity representing a size of an empty storage space of the zone buffer in which no data is stored.

In accordance with another aspect of the present disclosure, there is provided a method for operating a memory controller that controls a memory device including a plurality of memory areas respectively corresponding to a plurality of groups of logical addresses to be provided by a host and a buffer memory including a common buffer and a plurality of zone buffers respectively corresponding to the plurality of memory areas, the method including: receiving, from the host, a logical address and write data corresponding to the logical address; determining whether a size of the write data exceeds an available storage capacity of a zone buffer, corresponding to the logical address, among the plurality of zone buffers, the available storage capacity representing a size of an empty storage space of the zone buffer in which no data is stored; controlling the buffer memory to store the write data in the zone buffer in response to that the size of the write data is equal to or smaller than the available storage capacity of the zone buffer; and controlling the buffer memory to store the write data in the common buffer in response to that the size of the write data exceeds the available storage capacity of the zone buffer.

In accordance with still another aspect of the present disclosure, there is provided a storage device including: a memory device including a plurality of memory areas respectively corresponding to a plurality of logical address groups, each of which corresponds to consecutive logical addresses provided by a host; plurality of zone buffers respectively corresponding to the plurality of memory areas, the plurality of zone buffers respectively storing data corresponding to the plurality of logical address groups; and a memory controller configured to control the plurality of zone buffers to store write data corresponding to a logical address provided by the host in a zone buffer corresponding to the logical address among the plurality of zone buffers.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6 is a diagram illustrating buffer status information stored in a buffer status storage shown in FIG. 5.

DETAILED DESCRIPTION

In the present disclosure, advantages, features and methods for achieving them will become more apparent after a reading of the following exemplary embodiments taken in conjunction with the drawings. The present disclosure may, however, be embodied in different forms and should not be construed as being limited to the embodiments set forth herein. Rather, these embodiments are provided to describe the present disclosure in detail to the extent that those skilled in the art to which the disclosure pertains may easily enforce the technical concept of the present disclosure.

Figure 1:
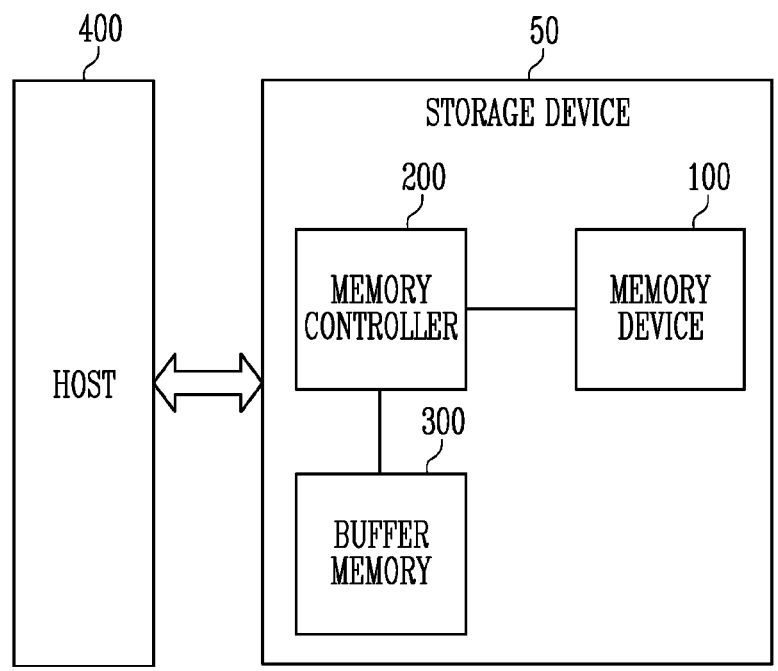
FIG. 1 is a diagram illustrating a storage device in accordance with an embodiment of the present disclosure.

FIG. 1 illustrates a storage device 50 in accordance with an embodiment of the present disclosure.

Referring to FIG. 1, the storage device 50 may include a memory device 100 and a memory controller 200 configured to control an operation of the memory device 100. The storage device 50 may be a device for storing data under the control of a host 400 such as a mobile phone, a smart phone, an MP3 player, a laptop computer, a desktop computer, a game console, a TV, a tablet PC, an in-vehicle infotainment, or the like.

The storage device 50 may be manufactured as any one of various types of storage devices according to a host interface that is a communication scheme with the host 400. For example, the storage device 50 may be implemented with any one of a variety of types of storage devices such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), a Wafer-level Stack Package (WSP), and the like.

The memory device 100 may store data. The memory device 100 operates under the control of the memory controller 200. The memory device 100 may include a memory cell array including a plurality of memory cells for storing data.

Each of the memory cells may be configured as a Single Level Cell (SLC) storing one bit of data, a Multi-Level Cell (MLC) storing two bits of data, a Triple Level Cell (TLC) storing three bits of data, or a Quad Level Cell (QLC) storing four bits of data.

The memory cell array may include a plurality of memory blocks. Each memory block may include a plurality of memory cells. One memory block may include a plurality of pages. In an embodiment, a page may be a unit for storing data in the memory device 100 or reading data stored in the memory device 100.

A memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

The memory device 100 receives a command and an address from the memory controller 200 and accesses a memory area selected by the address in the memory cell array. That is, the memory device 100 may perform an operation instructed by the command on the memory area selected by the address. For example, the memory device 100 may perform a write (or program) operation, a read operation, and an erase operation on the memory area. In the program operation, the memory device 100 may program data in the memory area selected by the address. In the read operation, the memory device 100 may read data stored in the memory area selected by the address. In the erase operation, the memory device 100 may erase data stored in the memory area selected by the address.

The memory controller 200 may control overall operations of the storage device 50.

When power is applied to the storage device 50, the memory controller 200 may execute firmware (FW). When the memory device 100 is the NAND flash memory, the memory controller 200 may execute FW such as a Flash Translation Layer (FTL) for controlling communication between the host 400 and the memory device 100.

In an embodiment, the memory controller 200 may receive write data and a Logical Block Address (LBA) from the host 400, and translate the LBA into a Physical Block Address (PBA) representing addresses of memory cells included in the memory device 100, in which the write data is to be stored.

The memory controller 200 may control the memory device 100 to perform a program operation, a read operation, an erase operation, or the like in response to a request from the host 400. In the program operation, the memory controller 200 may provide a program command, a PBA, and write data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a command, an address, and data regardless of any request from the host 400, and transmit the command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. The memory controller 200 may control the at least two memory devices 100 according to an interleaving scheme so as to improve operational performance. The interleaving scheme may be an operating scheme that allows operating sections of the at least two memory devices 100 to overlap with each other.

The host 400 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), a Load Reduced DIMM (LRDIMM), and the like.

The memory controller 200 may control a buffer memory 300 to temporarily store write data to be stored in the memory device 100 according to a request of the host 400. The write data may be stored in a storage space (not shown) that is pre-allocated in the buffer memory 300 according to a logical address.

A size of write data programmed in the memory device 100 through a one-time program operation may be referred to as a program unit size. A size of write data input to the memory controller 200 according to a program request received from the host 400 may be different from the program unit size of the memory device 100. Therefore, the memory controller 200 may store, in the buffer memory 300, the write data received from the host 400 according to the program request. Subsequently, when a size of write data stored in the buffer memory 300 reaches the program unit size, the memory controller 200 may control the buffer memory 300 and the memory device 100 to program the write data to the memory device 100.

The buffer memory 300 may be a volatile memory device. Therefore, when the supply of power is interrupted, data stored in the buffer memory 300 may not be retained.

Referring to FIG. 1, it is illustrated that the buffer memory 300 is located at the outside of the memory controller 200 while being included in the storage device 50. However, in various embodiments, the buffer memory 300 may be located in the memory controller 200.

Figure 2:
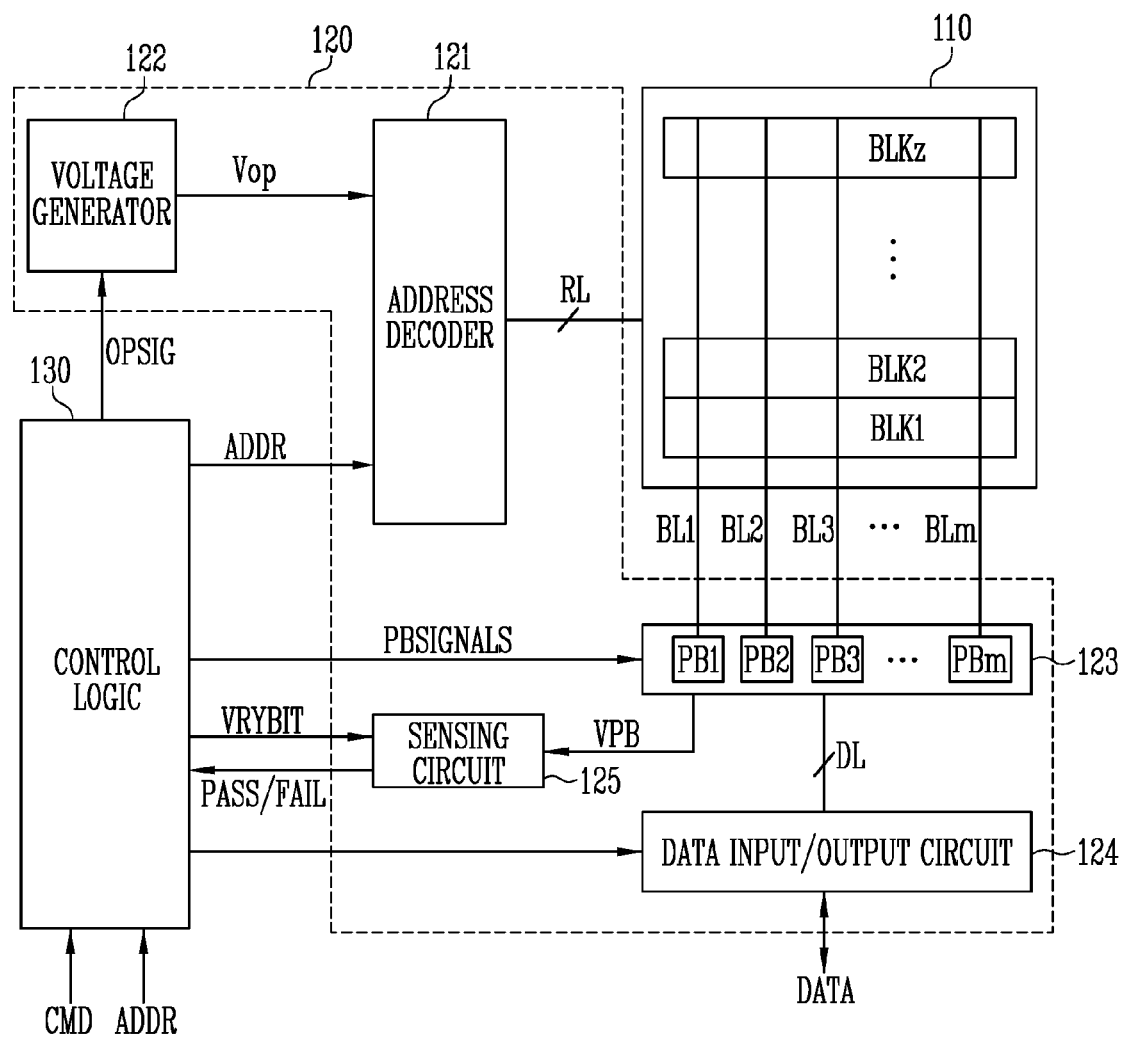
FIG. 2 is a diagram illustrating a memory device shown in FIG. 1.

FIG. 2 illustrates the memory device 100 shown in FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read/write circuit 123 through bit lines BL1 to BLm. Each of the plurality of memory blocks BLK1 to BLKz includes a plurality of memory cells. In an embodiment, the plurality of memory cells may be nonvolatile memory cells. Memory cells connected to the same word line among the plurality of memory cells may be defined as one physical page (PG). That is, the memory cell array 110 may be configured with a plurality of physical pages. In accordance with an embodiment of the present disclosure, each of the plurality of memory blocks BLK1 to BLKz included in the memory cell array 110 may include a plurality of dummy cells. One or more dummy cells may be connected in series between a drain select transistor and memory cells and between the memory cells and a source select transistor.

Each of the memory cells of the memory device 100 may be configured as a Single Level Cell (SLC), a Multi-Level Cell (MLC), a Triple Level Cell (TLC), or a Quad Level Cell (QLC).

The peripheral circuit 120 may include the address decoder 121, a voltage generator 122, the read/write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may operate under the control of the control logic 130. The address decoder 121 receives an address ADDR from the control logic 130.

The address decoder 121 may decode a block address in the received address ADDR. The address decoder 121 selects at least one memory block among the memory blocks BLK1 to BLKz according to the decoded block address. The address decoder 121 may decode a row address in the received address ADDR. The address decoder 121 may select at least one word line among word lines of a memory block selected according to the decoded row address. The address decoder 121 may apply an operating voltage Vop supplied from the voltage generator 122 to the selected word line.

In a program operation, the address decoder 121 may apply a program voltage to the selected word line, and apply a pass voltage to unselected word lines, the pass voltage having a level lower than that of the program voltage. In a program verify operation, the address decoder 121 may apply a verify voltage to the selected word line, and apply a verify pass voltage to the unselected word lines, the verify pass voltage having a level higher than that of the verify voltage.

In a read operation, the address decoder 121 may apply a read voltage to the selected word line, and apply a read pass voltage to the unselected word lines, the read pass voltage having a level higher than that of the read voltage.

An erase operation of the memory device 100 is performed in units of memory blocks. In the erase operation, the address ADDR input to the memory device 100 includes a block address. The address decoder 121 may decode the block address and select at least one memory block according to the decoded block address. In the erase operation, the address decoder 121 may apply a ground voltage to word lines connected to the selected memory block.

The address decoder 121 may decode a column address in the address ADDR transmitted thereto. The decoded column address may be transmitted to the read/write circuit 123. Exemplarily, the address decoder 121 may include components such as a row decoder, a column decoder, and an address buffer.

The voltage generator 122 may generate a plurality of operating voltages Vop by using an external power voltage supplied to the memory device 100. The voltage generator 122 operates under the control of the control logic 130.

The voltage generator 122 may generate an internal power voltage by regulating the external power voltage. The internal power voltage generated by the voltage generator 122 may be used as an operation voltage of the memory device 100.

The voltage generator 122 may generate the plurality of operating voltages Vop by using the external power voltage or the internal power voltage. The voltage generator 122 may generate various voltages required by the memory device 100. For example, the voltage generator 122 may generate a plurality of erase voltages, a plurality of program voltages, a plurality of dummy program voltages, a plurality of pass voltages, a plurality of verify voltages, a plurality of verify pass voltages, a plurality of read voltages, and a plurality of read pass voltages, and so on.

In order to generate the plurality of operating voltages Vop having various voltage levels, the voltage generator 122 may include a plurality of pumping capacitors for receiving the external power voltage or the internal power voltage, and generate the plurality of operating voltages Vop by selectively activating the plurality of pumping capacitors under the control of the control logic 130.

The plurality of operating voltages Vop may be supplied to the memory cell array 110 by the address decoder 121.

The read/write circuit 123 includes first to mth page buffers PB1 to PBm. The first to mth page buffers PB1 to PBm are connected to the memory cell array 110 through the respective first to mth bit lines BL1 to BLm. The first to mth page buffers PB1 to PBm operate under the control of the control logic 130.

The first to mth page buffers PB1 to PBm communicate data DATA with the data input/output circuit 124 through data lines DL. In a program operation, the first to mth page buffers PB1 to PBm receive data DATA to be stored through the data input/output circuit 124 and data lines DL.

In the program operation, the first to mth page buffers PB1 to PBm may transfer, to selected memory cells, through the bit lines BL1 to BLm, data DATA received through the data input/output circuit 124 when a program pulse is applied to a selected word line. The selected memory cells are programmed according to the transferred data DATA. A memory cell connected to a bit line through which a program allow voltage (e.g., a ground voltage) is applied may have an increased threshold voltage. A threshold voltage of a memory cell connected to a bit line through which a program inhibit voltage (e.g., a power voltage) is applied may be maintained. In a program verify operation, the first to mth page buffers PB1 to PBm read the data DATA stored in the selected memory cells through the bit lines BL1 to BLm.

In the read operation, the read/write circuit 123 may read data DATA from memory cells of a selected page through the bit lines BL1 to BLm, and store the read data DATA in the first to mth page buffers PB1 to PBm.

In the erase operation, the read/write circuit 123 may float the bit lines BL1 to BLm. In an embodiment, the read/write circuit 123 may include a column select circuit.

The data input/output circuit 124 is connected to the first to mth page buffers PB1 to PBm through the data lines DL. The data input/output circuit 124 operates under the control of the control logic 130.

The data input/output circuit 124 may include a plurality of input/output buffers (not shown) that receive input data DATA. In the program operation, the data input/output circuit 124 may receive data DATA to be stored from an external controller, e.g., the memory controller 200 of FIG. 1. In the read operation, the data input/output circuit 124 outputs, to the external controller, data transmitted from the first to mth page buffers PB1 to PBm included in the read/write circuit 123.

In the read operation or the program verify operation, the sensing circuit 125 may generate a reference current in response to a verify bit signal VRYBIT generated by the control logic 130, and output a pass signal PASS or a fail signal FAIL to the control logic 130 by comparing a sensing voltage VPB received from the read/write circuit 123 and a reference voltage generated by the reference current.

The control logic 130 may be connected to the address decoder 121, the voltage generator 122, the read/write circuit 123, the data input/output circuit 124, and the sensing circuit 125. The control logic 130 may control the overall operations of the memory device 100. The control logic 130 may operate in response to a command CMD transferred from an external device, e.g., the memory controller 200 of FIG. 1.

The control logic 130 may control the peripheral circuit 120 by generating several signals in response to the command CMD and the address ADDR provided by the external device. For example, the control logic 130 may generate an operation signal OPSIG, a row address RADD, a read/write circuit control signal PBSIGNALS, the verify bit signal VRYBIT, and so on in response to the command CMD and the address ADDR. The control logic 130 may output the operation signal OPSIG to the voltage generator 122, output the row address RADD to the address decoder 121, output the read/write circuit control signal PBSIGNALS to the read/write circuit 123, and output the verify bit signal VRYBIT to the sensing circuit 125. Also, the control logic 130 may determine whether the program verify operation has passed or failed in response to the pass or fail signal PASS/FAIL output by the sensing circuit 125.

Figure 3:
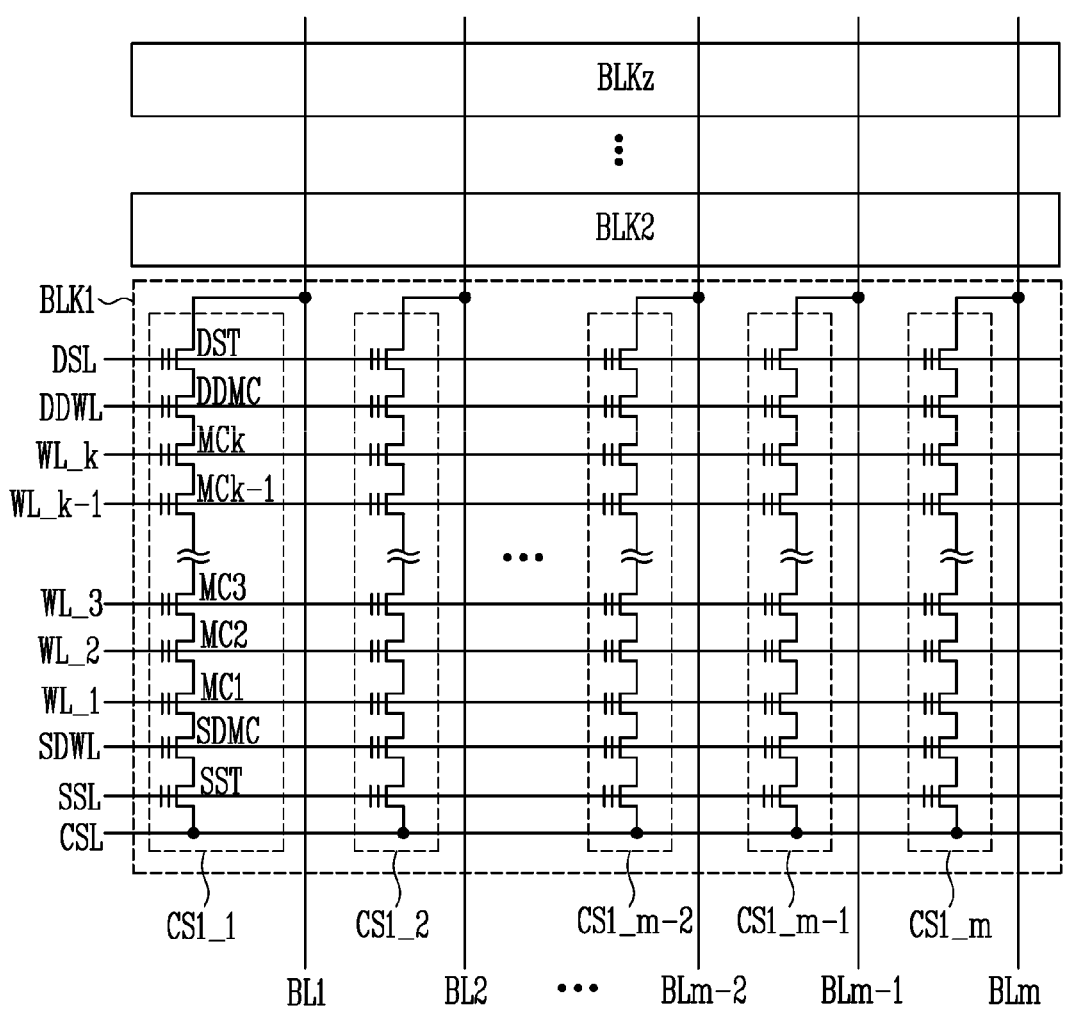
FIG. 3 is a diagram illustrating a memory cell array shown in FIG. 2.

FIG. 3 illustrates the memory cell array 110 shown in FIG. 2.

Referring to FIG. 3, first to zth memory blocks BLK1 to BLKz are commonly connected to the first to mth bit lines BL1 to BLm. In FIG. 3, for convenience of description, components included in the first memory block BLK1 among the plurality of memory blocks BLK1 to BLKz are illustrated, and components included in each of the other memory blocks BLK2 to BLKz are omitted. Each of the other memory blocks BLK2 to BLKz may be configured identically to the first memory block BLK1.

The memory block BLK1 may include a plurality of cell strings CS1_1 to CS1_m (m is a positive integer). The first to mth cell strings CS1_1 to CS1_m are respectively connected to the first to mth bit lines BL1 to BLm. Each of the first to mth cell strings CS1_1 to CS1_m includes a drain select transistor DST, a drain dummy cell DDMC, a plurality of memory cells MC1 to MCk (k is a positive integer), a source dummy cell SDMC, and a source select transistor SST, which are connected in series.

A gate terminal of the drain select transistor DST included in each of the first to mth cell strings CS1_1 to CS1_m is connected to a drain select line DSL. A gate terminal of the drain dummy cell DDMC included in each of the first to mth cell strings CS1_1 to CS1_m is connected to a drain dummy word line DDWL. Gate terminals of first to kth memory cells MC1 to MCk included in each of the first to mth cell strings CS1_1 to CS1_m are respectively connected to first to kth word lines WL_1 to WL_k. A gate terminal of the source dummy cell SDMC included in each of the first to mth cell strings CS1_1 to CS1_m is connected to a source dummy word line SDWL. A gate terminal of the source select transistor SST included in each of the first to mth cell strings CS1_1 to CS1_m is connected to a source select line SSL.

For convenience of description, a structure of a cell string will be described based on the first cell string CS1_1 among the plurality of cell strings CS1_1 to CS1_m. However, each of the other cell strings CS1_2 to CS1_m may be configured identically to the first cell string CS1_1.

A drain terminal of the drain select transistor DST included in the first cell string CS1_1 is connected to the first bit line BL1. A source terminal (or electrode) of the drain select transistor DST included in the first cell string CS1_1 is connected to a drain terminal of the drain dummy cell DDMC included in the first cell string CS1_1. The first to kth memory cells MC1 to MCk are connected in series to each other. The drain dummy cell DDMC and the kth memory cell MCK are connected in series to each other, and the first memory cell MC1 and the source dummy cell SDMC are connected in series to each other. A drain terminal of the source select transistor SST included in the first cell string CS1_1 is connected to a source terminal of the source dummy cell SDMC included in the first cell string CS1_1. A source terminal of the source select transistor SST included in the first cell string CS1_1 is connected to a common source line CSL. In an embodiment, the common source line CSL may be commonly connected to the first to zth memory blocks BLK1 to BLKz.

The drain select line DSL, the drain dummy word line DDWL, the first to kth word lines WL_1 to WL_k, the source dummy word line SDWL, and the source select line SSL are included in the row lines RL. The drain select line DSL, the drain dummy word line DDWL, the first to kth word lines WL1 to WLk, the source dummy word line SDWL, and the source select line SSL are controlled by the address decoder 121. The first to mth bit lines BL1 to BLm are controlled by the read/write circuit 123.

Figure 4:
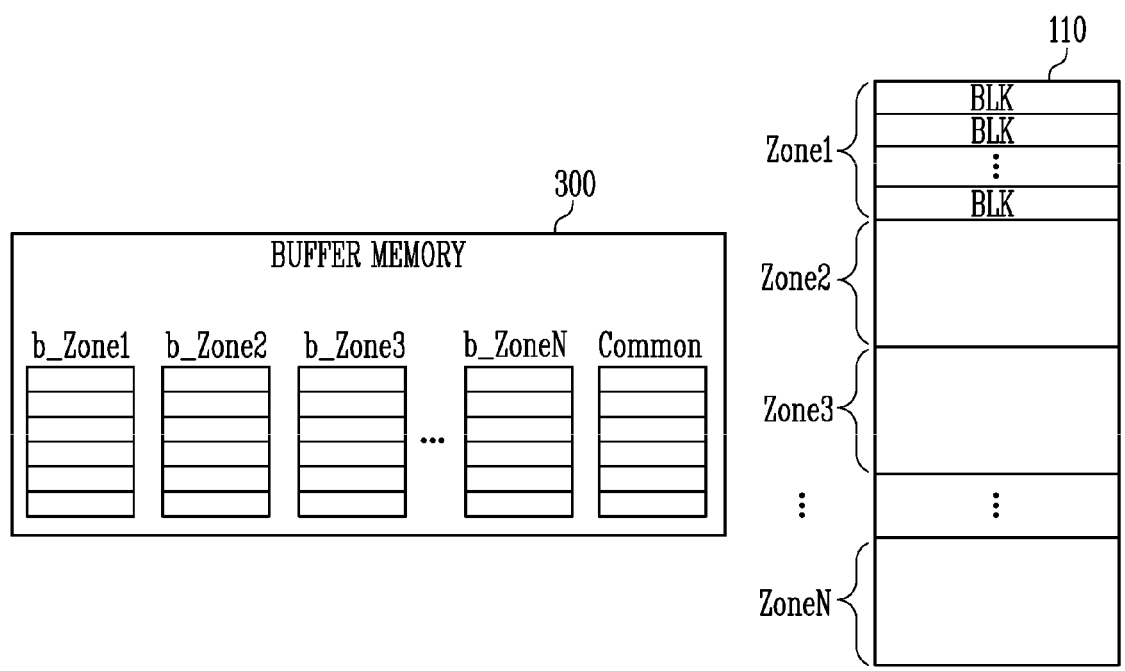
FIG. 4 is a diagram illustrating an operating method of a storage device to which a zone name space is applied in accordance with an embodiment of the present disclosure.

FIG. 4 illustrates an operating method of the storage device 50 of FIG. 1 to which a zone name space is applied in accordance with an embodiment of the present disclosure.

Referring to FIG. 4, the buffer memory 300 may be pre-allocated into first to Nth zone buffers b_Zone1 to b_ZoneN (N is a natural number greater than 1) and a common buffer Common. The memory cell array 110 may include the first to zth memory blocks BLK1 to BLKz described with reference to FIG. 2. A plurality of memory blocks may be allocated to one zone among first to Nth zones Zone1 to ZoneN (N is a natural number greater than 1). Numbers of memory blocks included in the respective zones may be different from each other. In an embodiment, a zone may be a memory area in which write data corresponding to consecutive logical addresses provided from the host 400 is stored.

Write data input from the host 400 may be determined in which zone among the first to Nth zones Zone1 to ZoneN the write data is to be stored, according to a logical address corresponding to the write data. Specifically, the memory controller 200 described with reference to FIG. 1 may determine a corresponding zone according to a range to which the logical address corresponding to the write data belongs. For example, logical addresses input from the host 400 may be divided into a plurality of logical address groups. Each of the logical address groups may include a plurality of consecutive logical addresses. Each of the plurality of logical address groups may correspond to any one zone among the first to Nth zones Zone1 to ZoneN.

For example, when the logical addresses input from the host 400 are LBA1 to LBA50, LBA1 to LBA10 belong to a first logical address group and may correspond to the first zone Zone1. LBA11 to LBA20 belong to a second logical address group and may correspond to the second zone Zone2. LBA21 to LBA30 belong to a third logical address group and may correspond to the third zone Zone3. LBA31 to LBA40 belong to a fourth logical address group and may correspond to the fourth zone Zone4. LBA41 to LBA50 belong to a fifth logical address group and may correspond to the fifth zone Zone5. When the logical address corresponding to the write data input from the host 400 is the LBA3, the LBA3 belongs to the first logical address group and corresponds to the first zone Zone1. Therefore, the write data may be stored in the first zone Zone1.

The first to Nth zone buffers b_Zone1 to b_ZoneN of the buffer memory 300 may respectively correspond to the plurality of logical address groups. For example, the first to fifth zone buffers b_Zone1 to b_Zone5 may respectively correspond to the first to fifth logical address groups. Therefore, the first to Nth zone buffers b_Zone1 to b_ZoneN may respectively correspond to the first to Nth zones Zone1 to ZoneN. For example, when the logical address corresponding to the write data input from the host 400 is the LBA32, the LBA32 belongs to the fourth logical address group, and hence the write data may be temporarily stored in the fourth zone buffer b_Zone4. Subsequently, the write data stored in the fourth zone buffer b_Zone4 may be programmed to the fourth zone Zone4.

In an embodiment, the common buffer Common of the buffer memory 300 may store write data regardless of a logical address group to which a logical address corresponding to the write data belongs. Specifically, any space capable of storing write data may no longer exist in the first to Nth zone buffers b_Zone1 to b_ZoneN due to repetitive program requests from the host 400. When write data having a size exceeding an available storage capacity of each of the first to Nth zone buffers b_Zone1 to b_ZoneN is input, the buffer memory 300 may be controlled to store the exceeding write data in the common buffer Common. Thus, the common buffer Common can store the exceeding write data regardless of logical address groups to which logical addresses input from the host 400 belong.

In an embodiment, a size of each of the first to Nth zone buffers b_Zone1 to b_ZoneN may be equal to the program unit size of the memory device 100. For example, a size of write data program-requested by the host 400 may be 4 KB, the program unit size of the memory device 100 may be 16

KB, and the size of each of the first to Nth zone buffers b_Zone1 to b_ZoneN may be 16 KB. When 16-KB write data is stored in the first zone buffer b_Zone1, the memory controller 200 may program the 16-KB write data stored in the first zone buffer b_Zone1 to the first zone Zone1 of the memory cell array 110. When the 16-KB write data is stored in the first zone buffer b_Zone1, it means that an available space capable of storing additional write data no longer exists in the first zone buffer b_Zone1.

In another embodiment, the size of each of the first to Nth zone buffers b_Zone1 to b_ZoneN may be multiple times of the program unit size of the memory device 100. For example, a size of write data program-requested by the host 400 may be 4 KB, the program unit size of the memory device 100 may be 16 KB, and the size of each of the first to Nth zone buffers b_Zone1 to b_ZoneN may be 32 KB. When 16-KB write data is stored in the first zone buffer b_Zone1, the memory controller 200 may program the 16-KB write data stored in the first zone buffer b_Zone1 to the first zone Zone1 of the memory cell array 110.

In an embodiment, a size of the common buffer Common of the buffer memory 300 may be multiple times of the program unit size of the memory device 100. For example, when the program unit size of the memory device 100 is 16 KB, the size of the common buffer Common may be 32 KB.

In an embodiment, the first to Nth zone buffers b_Zone1 to b_ZoneN and the common buffer Common may operate independently from each other.

Figure 5:
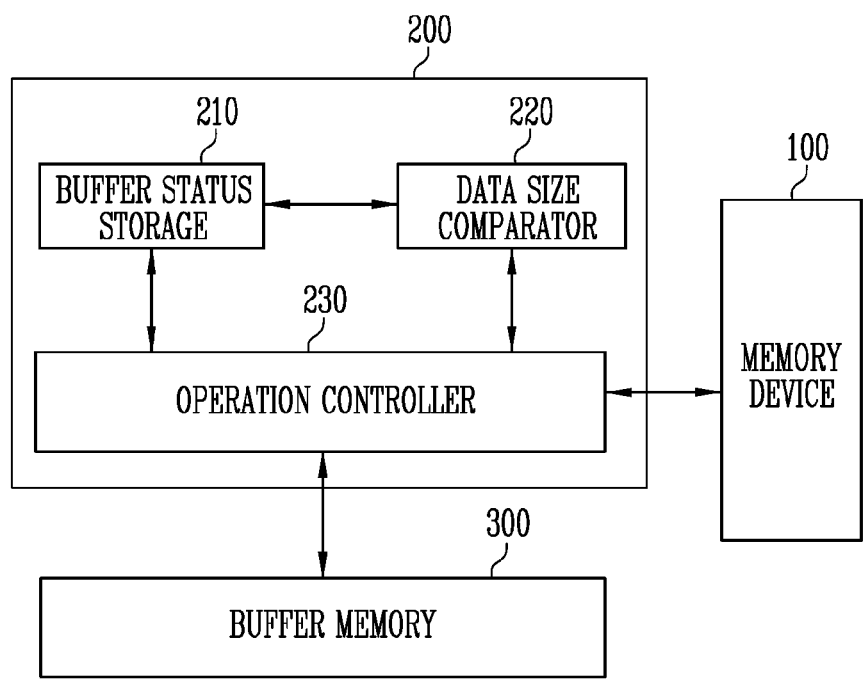
FIG. 5 is a diagram illustrating a memory controller in accordance with an embodiment of the present disclosure.

FIG. 5 illustrates the memory controller 200 of FIG. 1 according to an embodiment.

Referring to FIG. 5, the memory controller 200 described with reference to FIG. 1 may include a buffer status storage 210, a data size comparator 220, and an operation controller 230.

The buffer status storage 210 may store zone buffer status information associated with the first to Nth zone buffers b_Zone1 to b_ZoneN of the buffer memory 300 described with reference to FIG. 4 and common buffer status information associated with the common buffer Common of the buffer memory 300 described with reference to FIG. 4.

In an embodiment, the zone buffer status information may include size information of write data stored in each of the first to Nth zone buffers b_Zone1 to b_ZoneN, zone buffer available space information representing whether any available space for storing additional write data exists in each zone buffer, and logical address information corresponding to the write data stored in each zone buffer. The common buffer status information may include size information of write data stored in the common buffer Common, common buffer available space information representing whether any available space for storing additional write data exists in the common buffer, and zone ID information corresponding to the write data stored in the common buffer. The available space represents an empty space in which no data is stored.

The data size comparator 220 may compare a size of write data corresponding to a logical address provided from the host 400 with a size of an available space, i.e., an available storage capacity, of a zone buffer corresponding to the logical address.

In an embodiment, the data size comparator 220 may determine whether the size of the write data exceeds the available storage capacity of the zone buffer corresponding to the logical address.

Specifically, the data size comparator 220 may compare the size of the write data with the available storage capacity of the zone buffer based on the zone buffer status information stored in the buffer status storage 210. Also, the data size comparator 220 may determine whether any available space capable of storing the write data exists in the zone buffer based on a result obtained by comparing the size of the write data with the available storage capacity of the zone buffer. For example, when the size of the write data is equal to or smaller than the available storage capacity of the zone buffer, the data size comparator 220 may determine that an available space capable of storing the write data exists in the zone buffer. In another example, when the size of the write data exceeds the available storage capacity of the zone buffer, the data size comparator 220 may determine that any available space capable of storing the write data does not exist in the zone buffer.

Also, the data size comparator 220 may generate zone buffer available space information representing whether any available space capable of storing the write data exists in the zone buffer based on a result of comparing the size of the write data with the available storage capacity of the zone buffer. The data size comparator 220 may provide the zone buffer available space information to the buffer status storage 210 and the operation controller 230. The buffer status storage 210 may store the zone buffer available space information provided from the data size comparator 220. The operation controller 230 may control the buffer memory 300 to store the write data in the zone buffer corresponding to a logical address of the write data or the common buffer Common, based on the zone buffer available space information provided from the data size comparator 220.

The operation controller 230 may receive a request of the host 400, and control the memory device 100 and the buffer memory 300 to perform a program operation, a read operation, an erase operation, etc. according to the request. Also, the operation controller 230 may include information on logical address groups corresponding to the first to Nth zones Zone1 to ZoneN of the memory device 100 described with reference to FIG. 4. Also, the operation controller 230 may include information on logical address groups corresponding to the first to Nth zone buffers b_Zone1 to b_ZoneN of the buffer memory 300. Information on any one zone among the first to Nth zones Zone1 to ZoneN and information on any one zone buffer among the first to Nth zone buffers b_Zone1 to b_ZoneN of the buffer memory 300, which correspond to a same logical address, may be referred to as a zone ID Zone_ID.

The operation controller 230 may receive write data and a logical address corresponding to a program request from the host 400. After that, the operation controller 230 may check a predetermined zone ID corresponding to the logical address.

The operation controller 230 may determine a buffer for storing the write data, which is selected from a zone buffer corresponding to the logical address and the common buffer Common based on whether any available space exists in the zone buffer corresponding to the logical address.

In an embodiment, the operation controller 230 may control the buffer memory 300 to store the write data provided from the host 400 in one of the zone buffer corresponding to the logical address and the common buffer according to whether a size of the write data exceeds an available storage capacity of the zone buffer corresponding to the logical address.

In an embodiment, when the size of the write data is equal to or smaller than the available storage capacity of the zone buffer corresponding to the logical address, the operation controller 230 may control the buffer memory 300 to store the write data in the zone buffer corresponding to the logical address. Specifically, the operation controller 230 may receive zone buffer available space information corresponding to the pre-determined zone ID from the data size comparator 220. When an available space capable of storing the write data exists in the zone buffer, the operation controller 230 may control the buffer memory 300 to store the write data in the zone buffer corresponding to the logical address.

In an embodiment, when the size of the write data exceeds the available storage capacity of the zone buffer corresponding to the logical address, the operation controller 230 may control the buffer memory 300 to store the write data in the common buffer Common. For example, when any available space capable of storing the write data does not exist in the zone buffer, the operation controller 230 may receive the common buffer available space information from the buffer status storage 210. When an available space exists in the common buffer Common, the operation controller 230 may control the buffer memory 300 to store the write data in the common buffer Common.

In an embodiment, when the size of the write data exceeds the available storage capacity of each of the zone buffer corresponding to the logical address and the common buffer, the operation controller 230 may provide a standby signal to the host 400. For example, the data size comparator 220 may determine whether any available space capable of storing the write data exists in the common buffer Common based on a result obtained by comparing the size of the write data with the available storage capacity of the common buffer Common. When any available space capable of storing the write data does not exist even in the common buffer Common, the operation controller 230 may output the standby signal to the host 400. The buffer status storage 210 may update the stored buffer status information since the status of the buffer memory 300 has been changed according to the processing of the program request received from the host 400.

The operation controller 230 may control the buffer memory 300 and the memory device 100 to perform a program operation of storing write data stored in the zone buffers and the common buffer in a plurality of memory areas of the memory device 100, based on the zone ID, the zone buffer status information, and the common buffer status information, which are stored in the buffer status storage 210.

In an embodiment, when write data having a size corresponding to a data storage capacity allocated to a given zone buffer among the zone buffers of the buffer memory 300 is stored in the given zone buffer, the operation controller 230 may control the buffer memory 300 and the memory device 100 to store the write data stored in the given zone buffer in a memory area corresponding to the given zone buffer among the plurality of memory areas of the memory device 100. The data storage capacity allocated to a zone buffer represents the maximum data size that can be stored in the zone buffer.

For example, a program operation may be performed on a given zone buffer storing write data having a predetermined size or a size allocated to the given zone buffer among the first to Nth zone buffers b_Zone1 to b_ZoneN included in the buffer memory 300. The predetermined size may be the program unit size of the memory device 100. The size allocated to the given zone buffer may represent a size corresponding to the maximum data storage capacity of the given zone buffer. Specifically, when the size of the write data stored in the given zone buffer becomes the program unit size of the memory device 100, the operation controller 230 may control the buffer memory 300 and the memory device 100 to program the write data stored in the given zone buffer to the memory device 100. Also, when the size of the write data stored in the given zone buffer is equal to the size allocated to the given zone buffer, the operation controller 230 may control the buffer memory 300 and the memory device 100 to program the write data stored in the given zone buffer to the memory device 100.

After the program operation on the given zone buffer is completed, the operation controller 230 may control the buffer memory 300 to move write data corresponding to the given zone buffer, among data stored in the common buffer Common, to the given zone buffer.

In an embodiment, when write data having a size equal to the program unit size is stored in the common buffer Common, the operation controller 230 may control the buffer memory 300 and the memory device 100 to store the write data stored in the common buffer Common in a memory area corresponding to a logical address of the write data among the plurality of memory areas of the memory device 100. Specifically, when the size of the write data stored in the common buffer Common becomes the program unit size, the program operation may be performed on the common buffer Common without moving the write data to a given zone buffer corresponding to the logical address of the write data. The operation controller 230 may control the buffer memory 300 and the memory device 100 to program the write data having the program unit size in a corresponding memory area of the memory device 100, the corresponding memory area corresponding to the given zone buffer of the buffer memory 300.

FIG. 6 illustrates buffer status information stored in the buffer status storage 210 shown in FIG. 5.

Referring to FIG. 6, the buffer status storage 210 may include zone buffer status information and common buffer status information. Specifically, the zone buffer status information shown in FIG. 6 may correspond to the zone buffer status information for each of the zone buffers b_Zone1 to b_ZoneN of the buffer memory 300 described with reference to FIG. 4. For example, the zone buffer status information may include first to Nth zone buffer status information Zone1_inf to ZoneN_inf.

The zone buffer status information may include size information Data Size representing a size of write data stored in each zone buffer, zone buffer available space information Full representing whether any available space capable of storing additional write data exists in each zone buffer, and logical address information LBA of the write data stored in each zone buffer. For example, the first zone buffer status information Zone1_inf may include first size information Z1_data_Size representing a size of write data stored in the first zone buffer b_Zone1, first zone buffer available space information Full_Zone1 representing whether any available space capable of storing additional write data exists in the first zone buffer b_Zone1, and first logical address information Z1_LBA representing logical addresses of the write data stored in the first zone buffer b_Zone1. Each of the second to the Nth zone buffer status information Zone2_inf to ZoneN_inf may also include information on a corresponding zone buffer in the same form as the first zone buffer status information Zone1_inf.

Each of the zone buffers b_Zone1 to b_ZoneN may be managed as slots obtained by dividing a storage space of the zone buffer in a certain size unit. Therefore, a size of write data stored in the zone buffer may be represented to correspond to the number of slots storing the write data. That is, a value of each of first to Nth zone buffer data sizes Z1_data_Size to ZN_data_Size included in the zone buffer status information may correspond to the number of slots storing write data in a corresponding zone buffer. Each of first to Nth zone buffer available space information Full_Zone1 to Full_ZoneN may represent whether any available space capable of storing additional write data exists in a corresponding zone buffer. Therefore, each of the first to Nth zone buffer available space information Full_Zone1 to Full_ZoneN may have a "TRUE" or "FALSE" value. For example, when any available space capable of storing additional write data no longer exists in the first zone buffer b_Zone1, the first zone buffer available space information Full_Zone1 may have the "TRUE" value. Each of first to Nth zone buffer logical address information Z1_LBA to ZN_LBA may include a logical address.

The buffer status storage 210 may include common buffer status information as information on the common buffer described with reference to FIG. 4. The common buffer status information may include size information representing a size of write data stored in the common buffer, available space information representing whether any available space capable of storing additional write data exists in the common buffer, and zone ID information representing a zone corresponding to the write data stored in the common buffer.

Specifically, the common buffer status information may include size information C_data_Size representing a size of write data stored in the common buffer. The common buffer may be managed as slots obtained by dividing a storage space of the common buffer in a certain size unit. Therefore, a size of write data stored in the common buffer may be represented to correspond to the number of slots storing the write data. That is, a value of the size information C_data_Size may correspond to the number of slots storing the write data. The common buffer status information may include common buffer available space information Full_Common representing whether any available space capable of storing additional write data exists in the common buffer. Therefore, the common buffer available space information Full_Common may have a "TRUE" or "FALSE" value. For example, when any available space capable of storing additional write data no longer exists in the common buffer, the common buffer available space information Full_Common may have the "TRUE" value. When an available space capable of storing additional write data exists in the common buffer, the common buffer available space information Full_Common may have the "FALSE" value.

The common buffer status information may include first to Nth zone ID information C_Zone1 to C_ZoneN as information representing a zone corresponding to write data stored in the common buffer. Specifically, the first zone ID information C_Zone1 may include information for write data corresponding to the first zone buffer b_Zone1 among the write data stored in the common buffer. Similarly, each of the second to Nth zone ID information C_Zone2 to C_ZoneN may include information of write data corresponding to each zone among the write data stored in the common buffer. Each of the first to Nth zone ID information C_Zone1 to C_ZoneN may be managed in a linked list form. Therefore, whenever write data is stored in the common buffer, one of the first to Nth zone ID information C_Zone1 to C_ZoneN that corresponds to the stored write data may be updated.

Figure 7:
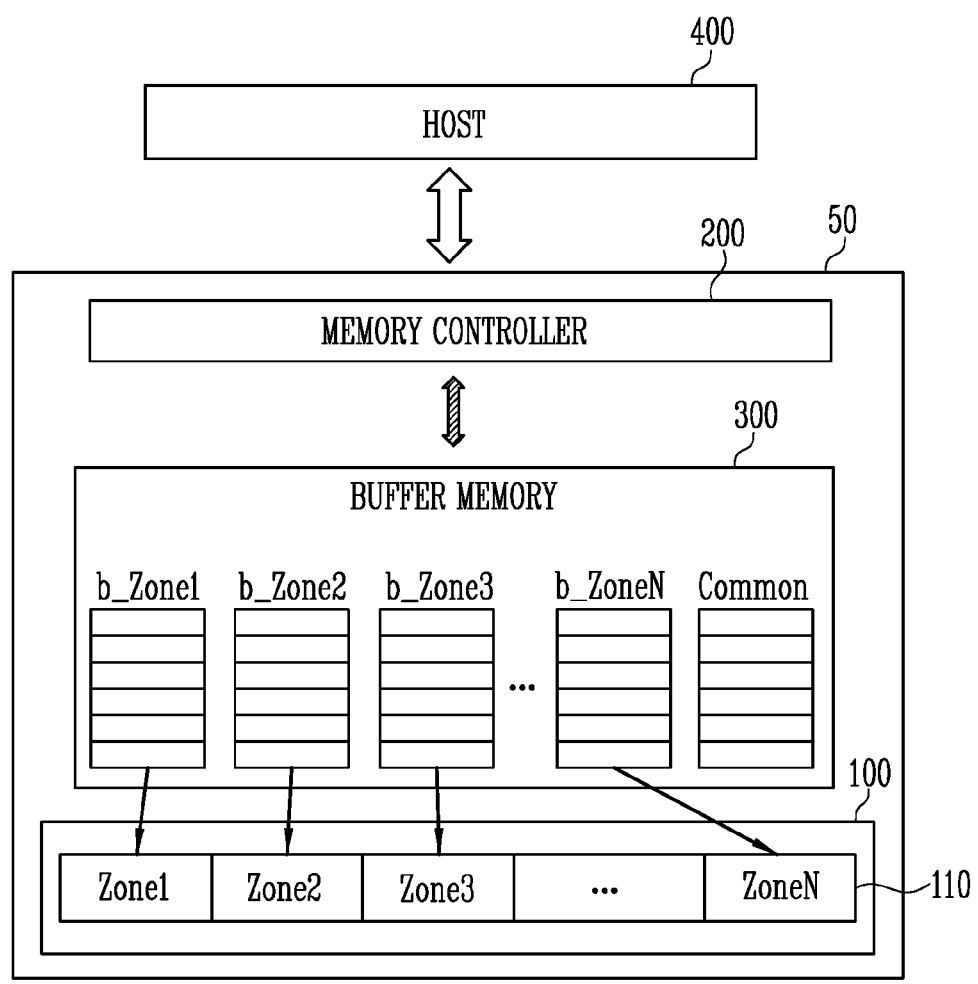
FIG. 7 is a diagram illustrating a program operation in accordance with an embodiment of the present disclosure.

FIG. 7 is a diagram illustrating a program operation of the storage device 50 of FIG. 1 in accordance with an embodiment of the present disclosure.

Referring to FIG. 7, in the program operation, the memory controller 200 may receive write data and a logical address, which are input from the host 400 and store the write data in the buffer memory 300. In FIG. 7, the memory cell array 110 may have the same structure as the memory cell array 110 described with reference to FIG. 4, and the buffer memory 300 may have the same structure as the buffer memory 300 described with reference to FIG. 4.

In an embodiment, the memory controller 200 may control the buffer memory 300 and the memory device 100 to program the write data stored in the first to Nth zone buffers b_Zone1 to b_ZoneN of the buffer memory 300 to the memory device 100. A size of the write data stored in each of the first to Nth zone buffers b_Zone1 to b_ZoneN of the buffer memory 300 may be the program unit size with which the write data can be programmed to the memory device 100. The write data stored in the first to Nth zone buffers b_Zone1 to b_ZoneN may be stored in the first to Nth zones Zone1 to ZoneN of the memory device 100 corresponding to the first to Nth zone buffers b_Zone1 to b_ZoneN, respectively.

For example, write data to be stored in the first zone Zone1 may be stored in the first zone buffer b_Zone1 of the buffer memory 300. When a size of the write data stored in the first zone buffer b_Zone1 becomes the program unit size, the memory controller 200 may control the buffer memory 300 and the memory device 100 to perform the program operation on the first zone buffer b_Zone1. Specifically, the memory controller 200 may control the buffer memory 300 and the memory device 100 to program the write data stored in the first zone buffer b_Zone1 to the first zone Zone1. For convenience of description, only the program operation performed on the first zone Zone1 has been described, but a program operation on each of the second to Nth zones Zone2 to ZoneN may be performed in the same manner as that performed on the first zone Zone1.

In an embodiment, an available space corresponding to write data stored in the common buffer Common may be generated in a zone buffer among the first to Nth zone buffers b_Zone1 to b_ZoneN by performing the program operation on the zone buffer. Therefore, after the program operation is performed, the memory controller 200 may control the buffer memory 300 to move the write data stored in the common buffer Common to the zone buffer in which the available space corresponding to the write data stored in the common buffer Common is generated. For example, when any available space does not exist in the first zone buffer b_Zone1, the buffer memory 300 may store write data corresponding to the first zone Zone1 in the common buffer Common. Subsequently, the program operation is performed on the first zone buffer b_Zone1, so that the available space can be generated in the first zone buffer b_Zone1. When the available space is generated in the first zone buffer b_Zone1, the memory controller 200 may control the buffer memory 300 to move the write data corresponding to the first zone Zone1, which is stored in the common buffer Common, to the first zone buffer b_Zone1.

In an embodiment, a size of write data stored in any of the first to Nth zone buffers b_Zone1 to b_ZoneN may be equal to the program unit size. The memory controller 200 may control the memory device 100 and the buffer memory 300 to perform a program operation on the zone buffer storing the write data whose size corresponds to the program unit size. By performing the program operation, the write data stored in the zone buffer is stored in a corresponding zone among the first to Nth zones Zone1 to ZoneN of the memory device 100. In addition, when a size of write data to be stored in the same zone among the write data stored in the common buffer Common becomes equal to the program unit size, the memory controller 200 may control the memory device 100 and the buffer memory 300 to perform a program operation on the write data stored in the common buffer Common to store the write data in the same zone of the memory device 100. By performing the program operation, the write data to be stored in the same zone among the write data stored in the common buffer Common is directly moved to the corresponding zone among the first to Nth zones Zone1 to ZoneN. A detailed program method thereof will be described with reference to FIGS. 8 to 12.

Figure 8:
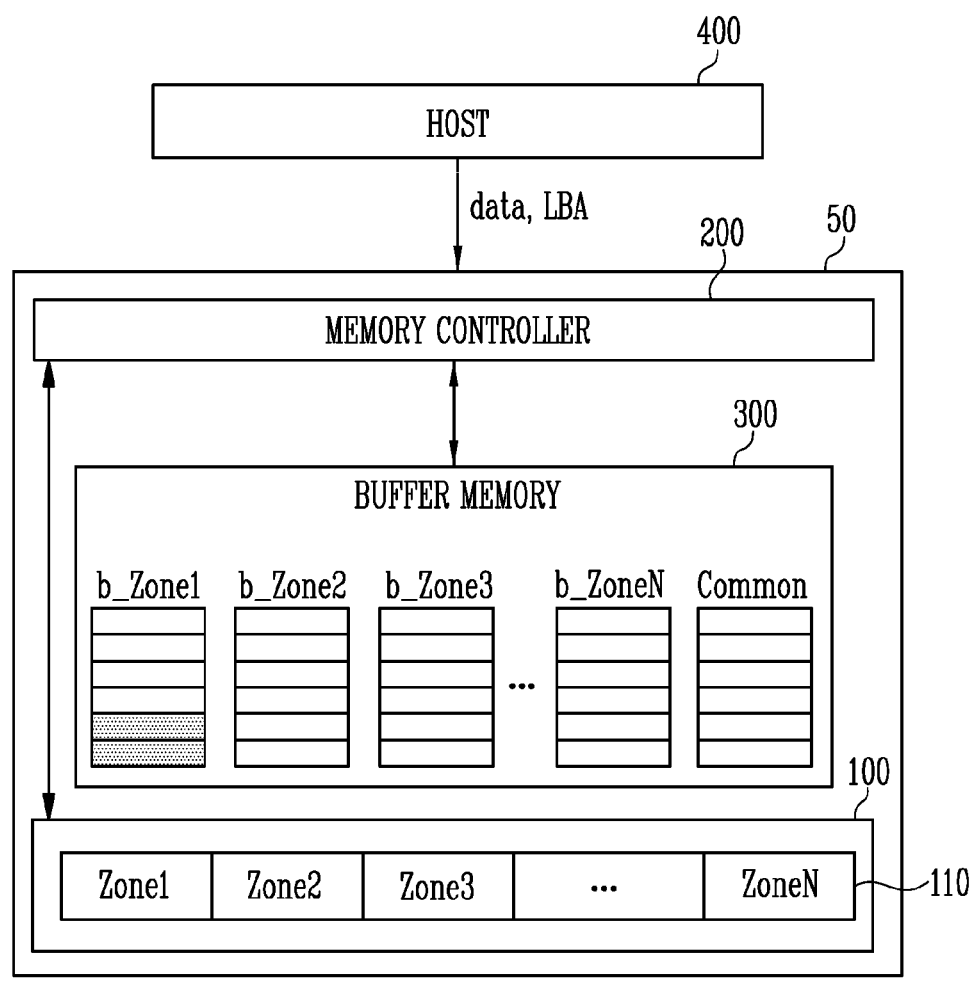
FIG. 8 is a diagram illustrating a buffer memory program operation in accordance with an embodiment of the present disclosure.
Figure 9:
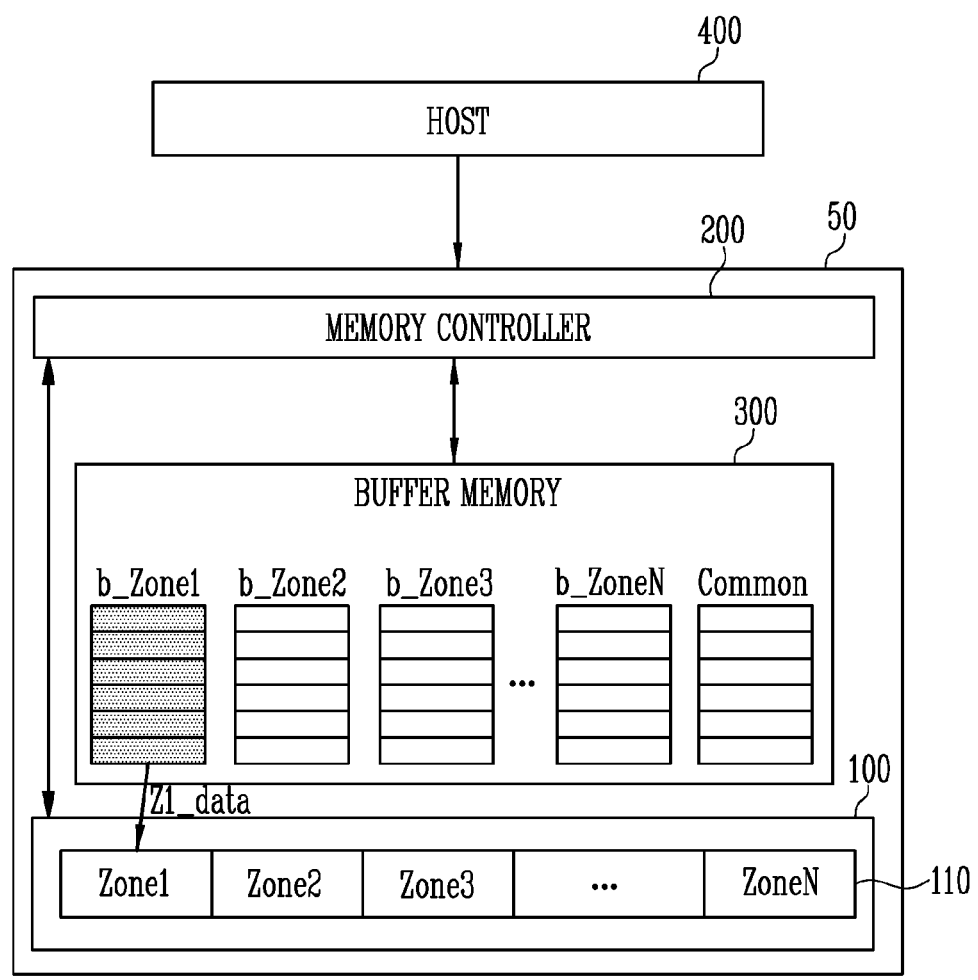
FIG. 9 is a diagram illustrating a memory device program operation in accordance with an embodiment of the present disclosure.

FIG. 8 illustrates a program operation for the buffer memory 300 of FIG. 1 in accordance with an embodiment of the present disclosure. FIG. 9 illustrates a program operation for the memory device 100 of FIG. 1 in accordance with an embodiment of the present disclosure.

Referring to FIGS. 8 and 9, the memory controller 200 may control the buffer memory 300 and the memory device 100 including the memory cell array 110 to perform a program operation according to a program request of the host 400.

In an embodiment, the memory controller 200 may receive write data data and a logical address LBA from the host 400. The memory controller 200 may determine a zone in which the write data data is to be stored among the first to Nth zones Zone1 to ZoneN of the memory cell array 110, based on the logical address LBA. Logical addresses input from the host 400 may be divided into a plurality of logical address groups according to a range thereof. The first to Nth zones Zone1 to ZoneN corresponding to the respective logical address groups may be predetermined. Information on the zone in which the write data data is to be stored may be referred to as a zone ID (not shown).

For example, the logical address LBA may correspond to the first zone Zone1 among the first to Nth zones Zone1 to ZoneN of the memory cell array 110. The zone ID corresponding to the write data data may represent the first zone Zone1. Therefore, since the zone ID of the write data data represents the first zone Zone1, the memory controller 200 may control the buffer memory 300 to store the write data data program-requested by the host 400 in the first zone buffer b_Zone1 corresponding to the first zone Zone1.

The memory controller 200 may control the buffer memory 300 in the same manner as the above-described manner whenever the memory controller 200 receives write data and a logical address from the host 400. Therefore, the buffer memory 300 may store the write data in a zone buffer corresponding to the logical address among the first to Nth zone buffers b_Zone1 to b_ZoneN of the buffer memory 300.

Referring to FIG. 9, in an embodiment, when write data having a size corresponding to a storage capacity allocated to any one zone buffer among the zone buffers b_Zone1 to b_ZoneN of the buffer memory 300 is stored in the one zone buffer, the memory controller 200 may control the buffer memory 300 to store the write data stored in the one zone buffer in a memory area corresponding to the one zone buffer among a plurality of memory areas of the memory device 100. For example, when any available space may no longer exist in the first zone buffer b_Zone1 corresponding to the first zone Zone1 due to repetitive program requests of the host 400, the memory controller 200 may control the buffer memory 300 and the memory device 100 to program write data Z1_data stored in the first zone buffer b_Zone1 to the first zone Zone1 since a size of the write data Z1_data becomes equal to a storage capacity allocated to the first zone buffer b_Zone1.

In another embodiment, when write data Z1_data having a size equal to the program unit size is stored in the first zone buffer b_Zone1 corresponding to the first zone Zone1, the memory controller 200 may control the buffer memory 300 and the memory device 100 to program the write data Z1_data stored in the first zone buffer b_Zone1 to the first zone Zone1. For convenience of description, only the program operation on the first zone Zone1 and the first zone buffer b_Zone1 has been described. However, a program operation on each of the second to Nth zones Zone2 to ZoneN and the second to Nth zone buffers b_Zone2 to b_ZoneN may be performed in the same manner as that performed on the first zone Zone1 and the first zone buffer b_Zone1.

Figure 10:
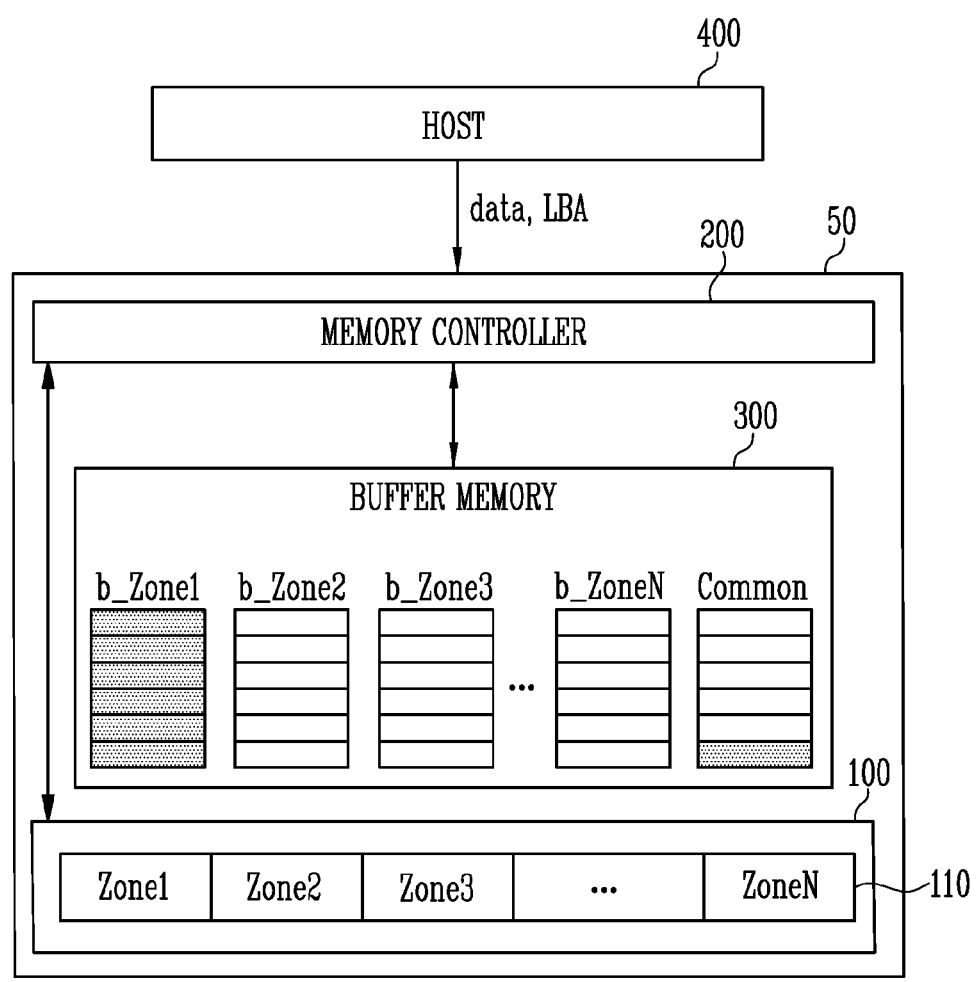
FIG. 10 is a diagram illustrating a program operation in accordance with an embodiment of the present disclosure.

FIG. 10 illustrates a program operation of the buffer memory 300 of FIG. 1 in accordance with an embodiment of the present disclosure.

Referring to FIG. 10, the memory controller 200 may receive a logical address LBA and write data data, which correspond to the first zone Zone1 among the first to Nth zones Zone1 to ZoneN of the memory cell array 110, from the host 400. Subsequently, the memory controller 200 may control the buffer memory 300 to store the write data data in the first zone buffer b_Zone1 corresponding to the first zone Zone1. However, at this point, an available space for storing the write data data may not exist in the first zone buffer b_Zone1 due to a program request which was previously processed. When the available space does not exist in the first zone buffer b_Zone1, the memory controller 200 may control the buffer memory 300 to store the write data data in the common buffer Common.

That is, due to repetitive program requests of the host 400, an available space may not exist in any zone buffer corresponding to a logical address LBA input from the host 400. In this case, the memory controller 200 may control the buffer memory 300 to store write data in the common buffer Common. Consequently, the common buffer Common may store write data corresponding to any of the first to Nth zones Zone1 to ZoneN.

Figure 11:
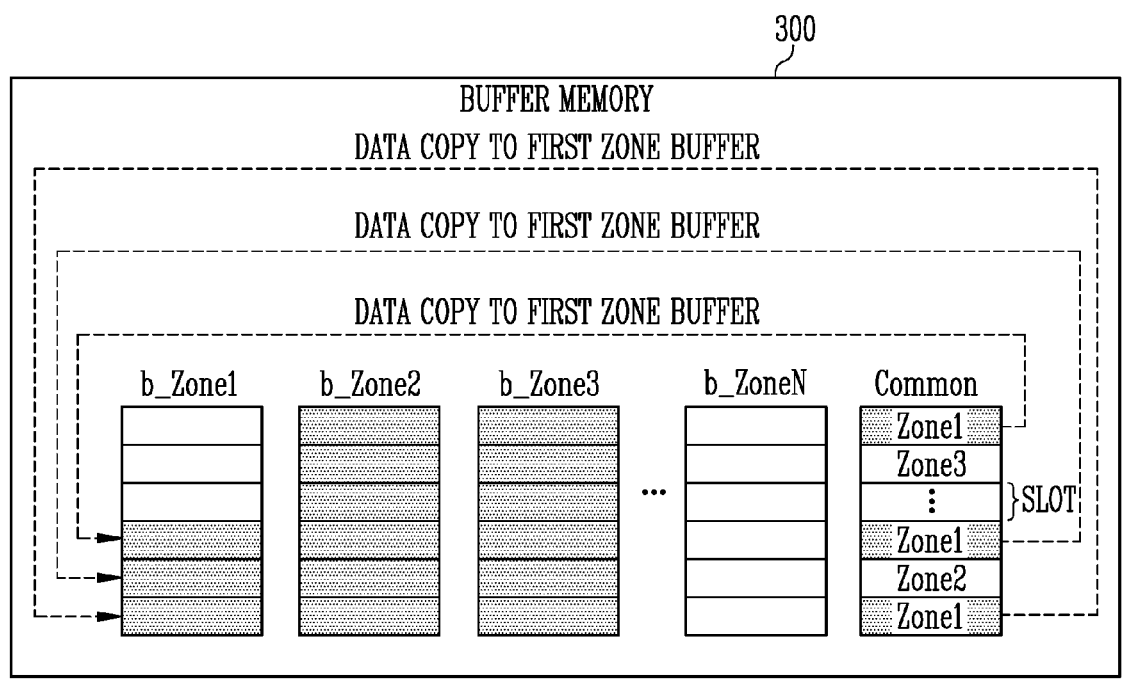
FIG. 11 is a diagram illustrating a buffer memory operation in accordance with an embodiment of the present disclosure.

FIG. 11 illustrates an operation of the buffer memory 300 of FIG. 1 in accordance with an embodiment of the present disclosure.

Referring to FIG. 11, the buffer memory 300 may include the first to Nth zone buffers b_Zone1 to b_ZoneN and the common buffer Common. Since repetitive program requests are received from the host 400, an available space capable of storing additional data may no longer exist in the second and third zone buffers b_Zone2 and b_Zone3. That is, the second and third zone buffers b_Zone2 and b_Zone3 are full of write data.

In an embodiment, the first to Nth zone buffers b_Zone1 to b_ZoneN and the common buffer Common may store write data by dividing a storage space thereof in a slot unit. In addition, the common buffer Common may store write data respectively corresponding to the first to Nth zones Zone1 to ZoneN described with reference to FIG. 4. For example, the common buffer Common may store write data respectively corresponding to the first to third zones Zone1 to Zone3. FIG. 11 illustrates that write data corresponding to the first zone Zone1 is stored in three slots of the common buffer Common, and write data corresponding to each of the second and third zones Zone2 and Zone3 is stored in one slot of the common buffer Common.

In an embodiment, the memory controller 200 may control the buffer memory 300 to store write data stored in any one zone buffer of the buffer memory 300 in a memory area of the memory device 100 that corresponds to the one zone buffer and then move write data corresponding to the one zone buffer, which is stored in the common buffer Common, to the one zone buffer.

For example, when write data stored in the first zone buffer b_Zone1 is programmed to a memory area corresponding to the first zone buffer b_Zone1, the first zone buffer b_Zone1 may have an available space. As described above with reference to FIG. 9, the memory controller 200 may control the buffer memory 300 to move write data corresponding to the first zone buffer b_Zone1, which is stored in the common buffer Common, to the first zone buffer b_Zone1. When the write data stored in the common buffer Common is moved to the first zone buffer b_Zone1, the memory controller 200 may control the buffer memory 300 to move the write data to the first zone buffer b_Zone1 in an order in which the write data was stored in the common buffer Common.

Figure 12:
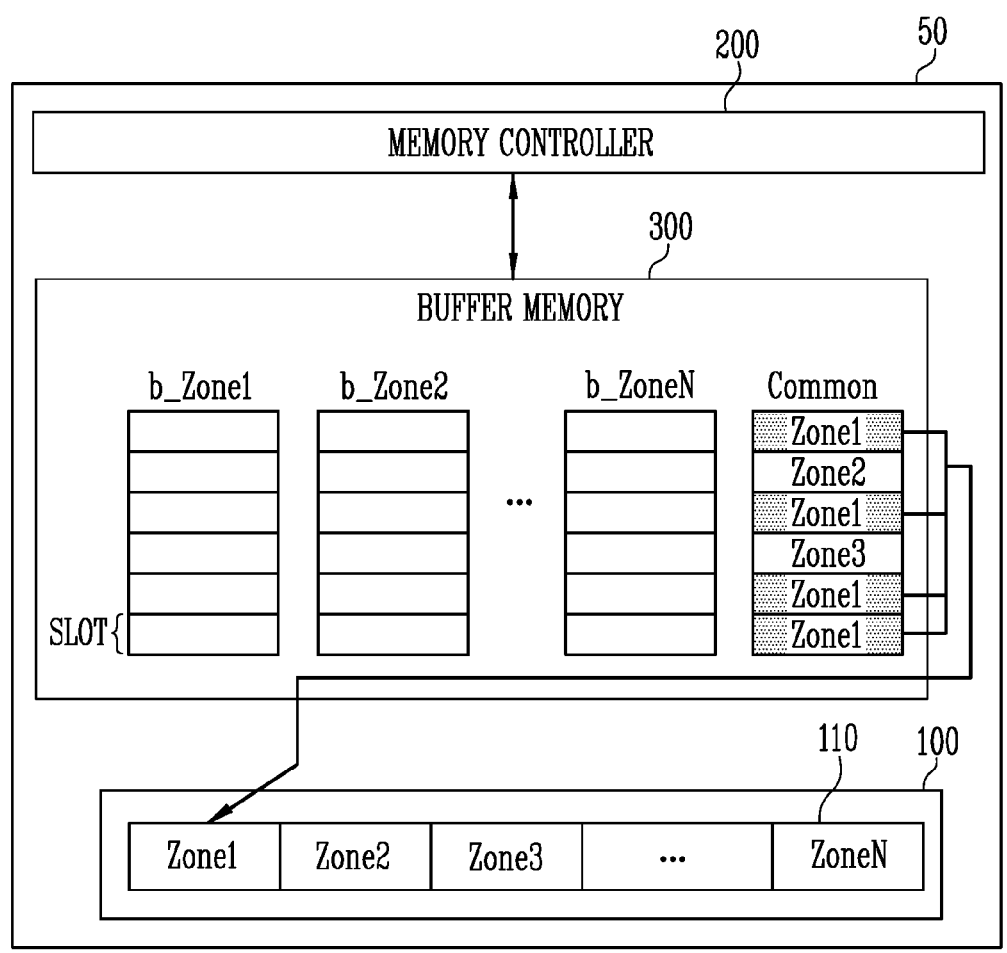
FIG. 12 is a diagram illustrating a program operation in accordance with an embodiment of the present disclosure.

FIG. 12 illustrates a program operation of the buffer memory 300 in accordance with an embodiment of the present disclosure.

Referring to FIG. 12, write data corresponding to any one of the first to Nth zones Zone1 to ZoneN may be sequentially stored in the common buffer Common.

In an embodiment, write data corresponding to the first zone Zone1 among the first to Nth zones Zone1 to ZoneN may be sequentially stored in the common buffer Common. A size of the write data corresponding to the first zone Zone1, which are sequentially stored in the common buffer Common, may be equal to the program unit size of the memory device 100. At this time, the memory controller 200 may control the memory device 100 and the buffer memory 300 to program the write data corresponding to the first zone Zone1, which are stored in the common buffer Common, directly to the first zone Zone1. The write data corresponding to the first zone Zone1, which are stored in the common buffer Common, may be stored in the first zone Zone1 in an order in which the write data were stored in the common buffer Common. For convenience of description, only a case where the write data corresponds to the first zone Zone1 has been described, but the present disclosure is not limited thereto.

In another embodiment, write data corresponding to each of the first to Nth zones Zone1 to ZoneN may be stored in the common buffer Common. A storage space of the common buffer Common may be managed to have slots obtained by dividing the storage space in a certain size unit. Write data input from the host 400 may be stored in the common buffer Common in a slot unit. For example, write data corresponding to the first zone Zone1 may be stored in four slots in the common buffer Common, and write data corresponding to each of the second and third zones Zone2 and Zone3 may be stored in one slot in the common buffer Common.

In an embodiment, a size of write data corresponding to the first zone Zone1 among the write data stored in the common buffer Common may be the program unit size. For example, the program unit size of the storage device 50 shown in FIG. 12 may correspond to four slots of the common buffer Common. The memory controller 200 may control the buffer memory 300 and the memory device 100 to program write data having a size of four slots, which correspond to the first zone Zone1, among the write data stored in the common buffer Common, to the first zone Zone1. The memory controller 200 may control the buffer memory 300 and the memory device 100 to program the write data having the size of four slots in an order in which the write data were stored in the common buffer Common.

For example, the memory controller 200 may control the buffer memory 300 and the memory device 100 to select data slots corresponding to the first zone Zone1 and program the write data stored in the selected data slots in the first zone Zone1 in an order of the write data were stored in the common buffer Common. The memory controller 200 may acquire information on the write data corresponding to the first zone Zone1 from the buffer status storage 210 described with reference to FIG. 6.

Figure 13:
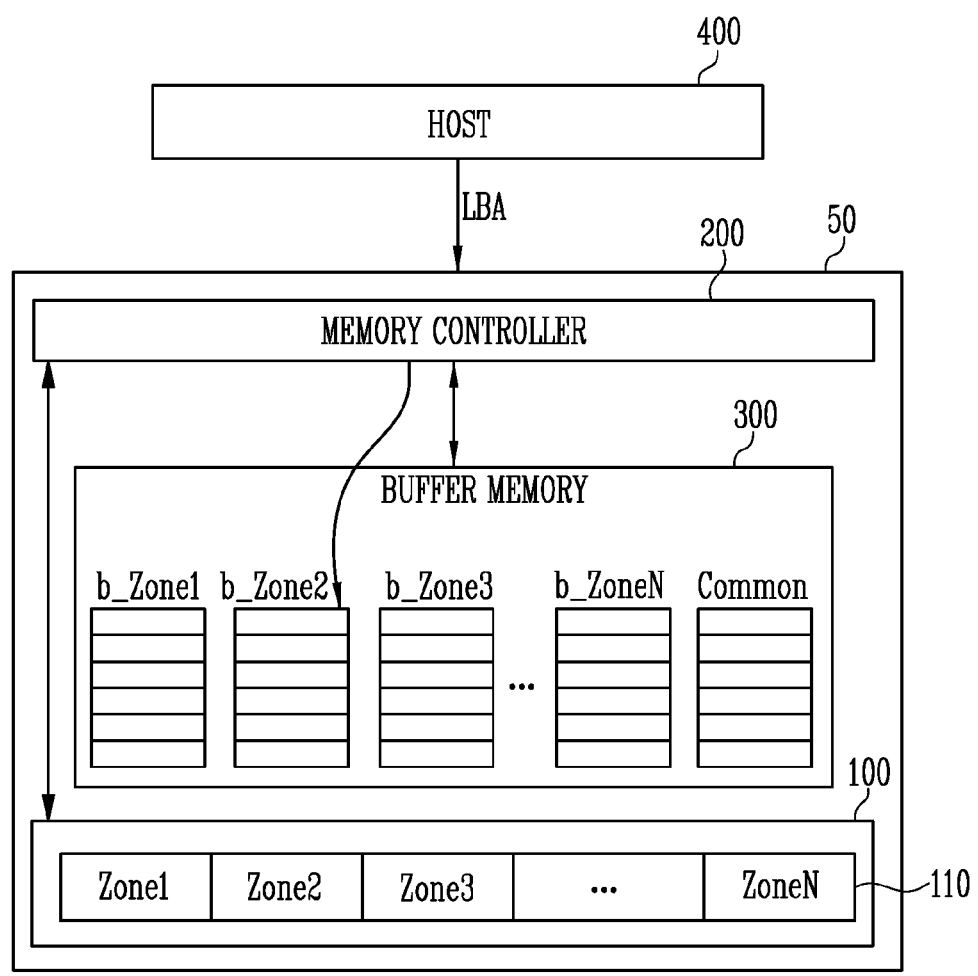
FIG. 13 is a diagram illustrating a read operation in accordance with an embodiment of the present disclosure.

FIG. 13 illustrates a read operation in accordance with an embodiment of the present disclosure.

Referring to FIG. 13, when the memory controller 200 receives a read request from the host 400, the memory controller 200 may control the memory device 100 and the buffer memory 300 to process the read request. The memory controller 200 may receive a logical address LBA input from the host 400 according to the read request.

In an embodiment, the memory controller 200 may translate the logical address LBA into a physical address PBA representing an address of memory cells of the memory device 100 in which read data corresponding to the read request is stored. In addition, information on a zone among the first to Nth zones Zone1 to ZoneN of the memory cell array 110, which corresponds to the logical address LBA, may be referred to as a zone ID. The memory controller 200 may control the memory device 100 and the buffer memory 300 to perform a read operation corresponding to the read request, based on the zone ID corresponding to the logical address LBA.

In an embodiment, the memory controller 200 may control the buffer memory 300 to perform a read operation before the memory device 100 performs a read operation. The storage device 50 may first perform the read operation on the buffer memory 300 to determine whether the read data corresponding to the logical address LBA read-requested from the host 400 is stored in the buffer memory 300. Subsequently, the storage device 50 may perform the read operation on the memory device 100.

Specifically, the memory controller 200 may provide the buffer memory 300 with a buffer read command and the logical address LBA. The buffer memory 300 may search for a zone buffer corresponding to the logical address LBA among the first to Nth zone buffers b_Zone1 to b_ZoneN to determine whether the read data corresponding to the logical address LBA is stored.

For example, the zone ID of the logical address LBA input from the host 400 may represent the second zone Zone2. The buffer memory 300 may search for only the second zone buffer b_Zone2 to determine whether the read data corresponding to the logical address LBA is stored in the second zone buffer b_Zone2. In accordance with this embodiment, all the first to Nth zone buffers b_Zone1 to b_ZoneN are not searched for, but only some of the first to Nth zone buffers b_Zone1 to b_ZoneN are searched for to determine whether the read data corresponding to the logical address LBA read-requested by the host 400 is stored in the buffer memory 300, so that the efficiency of the read operation can be improved.

Figure 14:
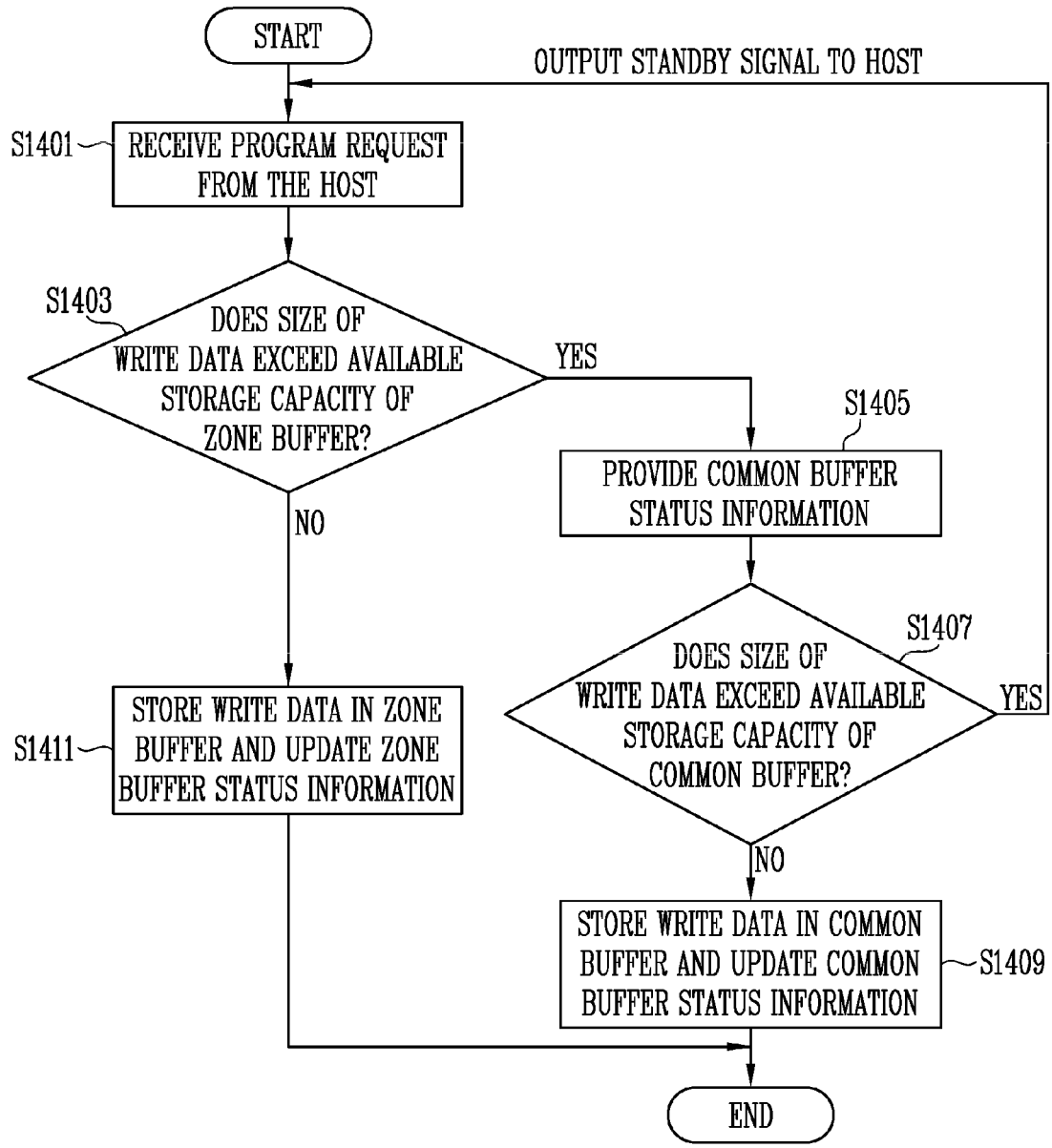
FIG. 14 is a flowchart illustrating an operating method of a storage device in accordance with an embodiment of the present disclosure.

FIG. 14 is a flowchart illustrating an operating method of the storage device 50 of FIG. 1 in accordance with an embodiment of the present disclosure. The operating method described in FIG. 14 will be described with reference to the related figures.

Referring to FIG. 14, in step S1401, the operation controller 230 of FIG. 5 may receive a program request including write data and a logical address from the host 400. The memory cell array 110 included in the memory device 100 may have the structure shown in FIG. 4. The buffer memory 300 may have the structure shown in FIG. 4.

In step S1403, the data size comparator 220 of FIG. 5 may determine whether a size of the write data exceeds an available storage capacity of a zone buffer corresponding to the logic address in the buffer memory 300. The available storage capacity of the zone buffer may correspond to a size of an empty space in the zone buffer in which data is not stored. For example, the data size comparator 220 may determine whether any available space exists in the zone buffer corresponding to the logical address, based on a result obtained by comparing the size of the write data with the available storage capacity of the zone buffer corresponding to the logical address. When the size of the write data exceeds the available storage capacity of the zone buffer corresponding to the logical address, the data size comparator 220 may determine that the available space does not exist in the zone buffer corresponding to the logical address. When the available space does not exist in the zone buffer, step S1405 may be performed.

In the step S1405, the data size comparator 220 may receive common buffer status information from the buffer status storage 210 of FIG. 5. The common buffer state information may include size information of data stored in the common buffer, information on whether an available space exists in the common buffer, and information on write data corresponding to a zone among the data stored in the common buffer.

In step S1407, the data size comparator 220 may determine whether the size of the write data exceeds an available storage capacity of the common buffer in the buffer memory 300, based on the common buffer state information provided from the buffer status storage 210. The available storage capacity of the common buffer may represent a size of an empty space in the common buffer in which data is not stored. For example, the data size comparator 220 may determine whether an available space capable of storing the write data exists in the common buffer, based on a result obtained by comparing the size of the write data with the available storage capacity of the common buffer. When the size of the write data exceeds the available storage capacity of the common buffer, the data size comparator 220 may determine that the available space does not exist in the common buffer. The operation controller 230 may output a standby signal to the host when the available space capable of storing the write data does not exist in the common buffer.

When it is determined in step S1407 that the size of the write data does not exceed the available storage capacity of the common buffer, in step S1409, the operation controller 230 may control the buffer memory 300 to store the write data input from the host 400 in the common buffer. Subsequently, the operation controller 230 may control the buffer status storage 210 to update the common buffer status information stored in the buffer status storage 210 based on a result of storing the write data in the common buffer.

Meanwhile, when it is determined in step S1403 that the size of the write data does not exceed the available storage capacity of the zone buffer, in step S1411, the operation controller 230 may control the buffer memory 300 to store the write data input from the host 400 in the zone buffer. Also, the operation controller 230 may control the buffer status storage 210 to update zone buffer status information stored in the buffer status storage 210 based on a result of storing the write data in the zone buffer.

Figure 15:
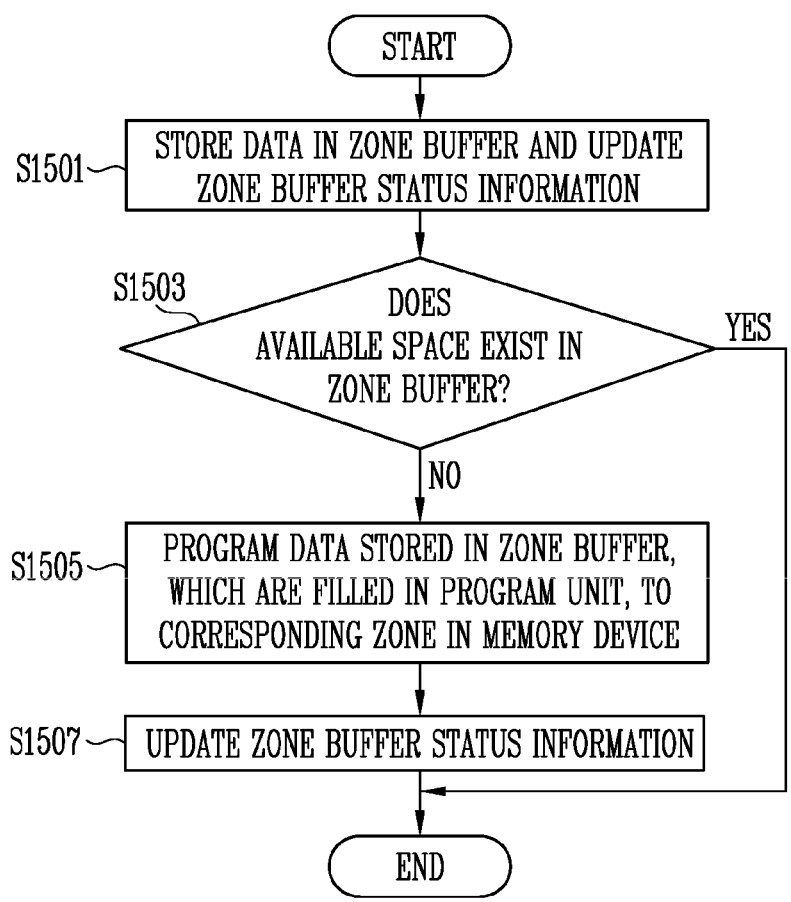
FIG. 15 is a flowchart illustrating an operating method of zone buffers in accordance with an embodiment of the present disclosure.

FIG. 15 is a flowchart illustrating an operating method of zone buffers in the buffer memory 300 of FIG. 1 in accordance with an embodiment of the present disclosure. The operating method described in FIG. 15 will be described with reference to the related figures.

Referring to FIG. 15, in step S1501, the operation controller 230 of FIG. 5 may store write data input from the host 400 in a zone buffer of the buffer memory 300 that corresponds to a logical address. Also, the operation controller 230 may control the buffer status storage 210 to update zone buffer status information corresponding to the zone buffer based on the storing of the write data in the zone buffer.

In step S1503, the operation controller 230 may determine whether an available space capable of storing additional write data exists in the zone buffer in which the write data is stored.

When the available space exists in the zone buffer, the procedure may be ended.

Alternatively, when the available space does not exist in the zone buffer, in step S1505, the operation controller 230 may control the buffer memory 300 and the memory device 100 to perform a program operation on the zone buffer. Specifically, the operation controller 230 may control the buffer memory 300 and the memory device 100 to program the write data stored in the zone buffer, which are filled in a program unit, to a zone in the memory device 100, which corresponds to the zone buffer. The write data stored in the zone buffer may have a size corresponding to the program unit size.

In step S1507, after the program operation on the zone buffer is performed, the operation controller 230 may control the buffer status storage 210 to update the zone buffer status information on the zone buffer.

Figure 16:
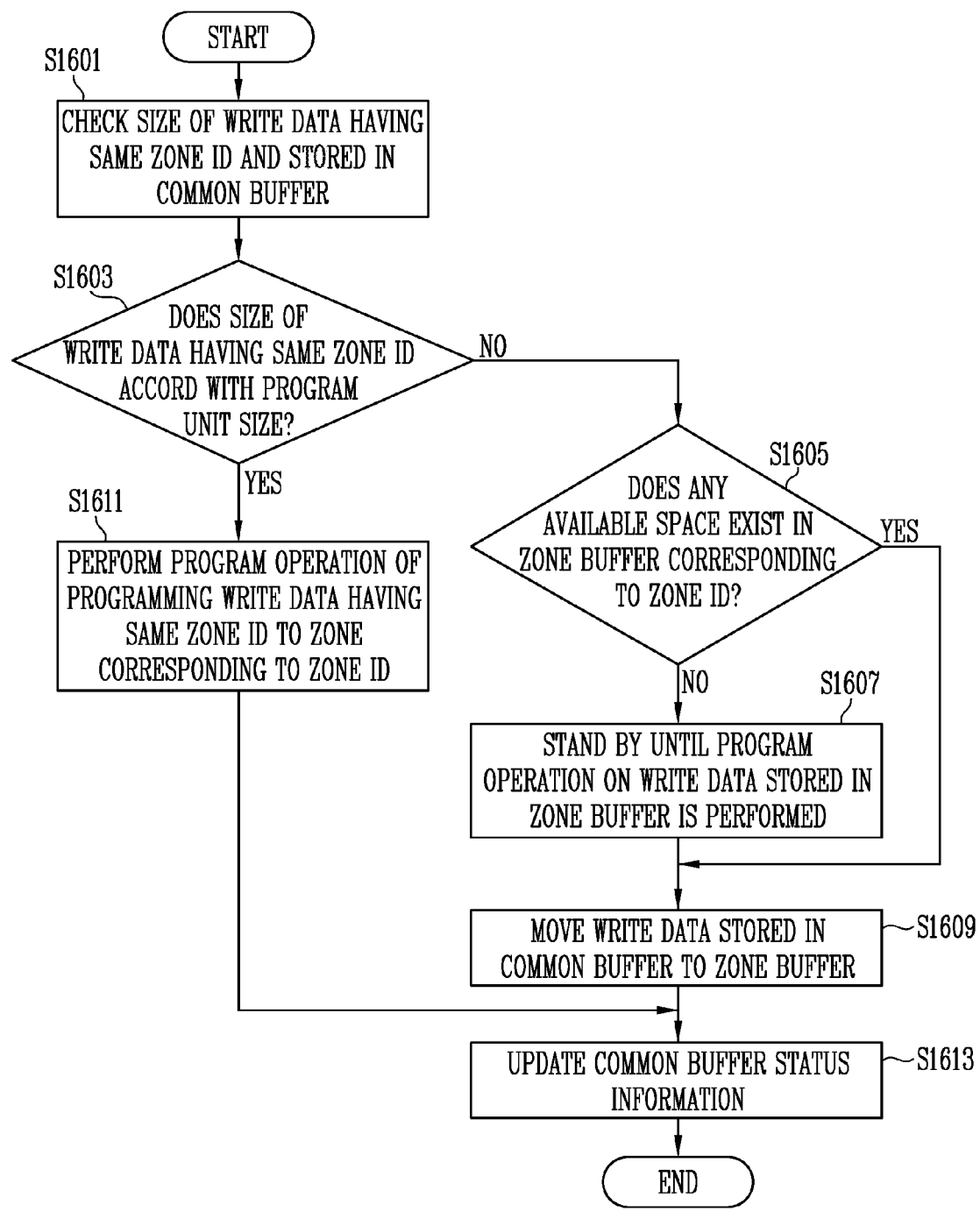
FIG. 16 is a flowchart illustrating an operating method of a common buffer in accordance with an embodiment of the present disclosure.

FIG. 16 is a flowchart illustrating an operating method of the common buffer in the buffer memory 300 of FIG. 1 in accordance with an embodiment of the present disclosure. The operating method described in FIG. 16 will be described with reference to the related figures.

Referring to FIG. 16, in step S1601, the operation controller 230 of FIG. 5 may check a size of write data having the same zone ID among write data stored in the common buffer. For example, the operation controller 230 may receive information on the write data stored in the common buffer, which is provided from the buffer status storage 210 of FIG. 5. The buffer status storage 210 may provide size information of the write data having the same zone ID among the write data stored in the common buffer.

In step S1603, the operation controller 230 may determine whether the size of the write data having the same zone ID among the write data stored in the common buffer accords with a program unit size of the memory device 100. When the size of the write data having the same zone ID accords with the program unit size, the operation controller 230 may perform step S1611. When the size of the data having the same zone ID does not accord with the program unit size, the operation controller 230 may perform step S1605.

In the step S1611, the operation controller 230 may control the buffer memory 300 and the memory device 100 to perform a program operation of programing the write data having the same zone ID to a zone corresponding to the zone ID that is included in the memory device 100.

In the step S1605, the operation controller 230 may determine whether any available space exists in a zone buffer corresponding to the zone ID that is included in the buffer memory 300.

When the available space no longer exists in the zone buffer corresponding to the zone ID, in step S1607, the operation controller 230 may control the buffer memory 300 to stand by until a program operation on write data stored in the zone buffer is performed.

Subsequently, when an available space is generated in the zone buffer by performing the program operation on the write data stored in the zone buffer, in step S1609, the operation controller 230 may control the buffer memory 300 to move the write data stored in the common buffer to the zone buffer corresponding to the zone ID.

Also, when it is determined in the step S1605 that the available space exists in the zone buffer corresponding to the zone ID, in the step S1609, the operation controller 230 may control the buffer memory 300 to move the write data stored in the common buffer to the zone buffer corresponding to the zone ID.

In step S1613, the operation controller 230 may control the buffer status storage 210 to update common buffer status information by reflecting a status of the common buffer, which is changed after step S1609 or S1611.

Figure 17:
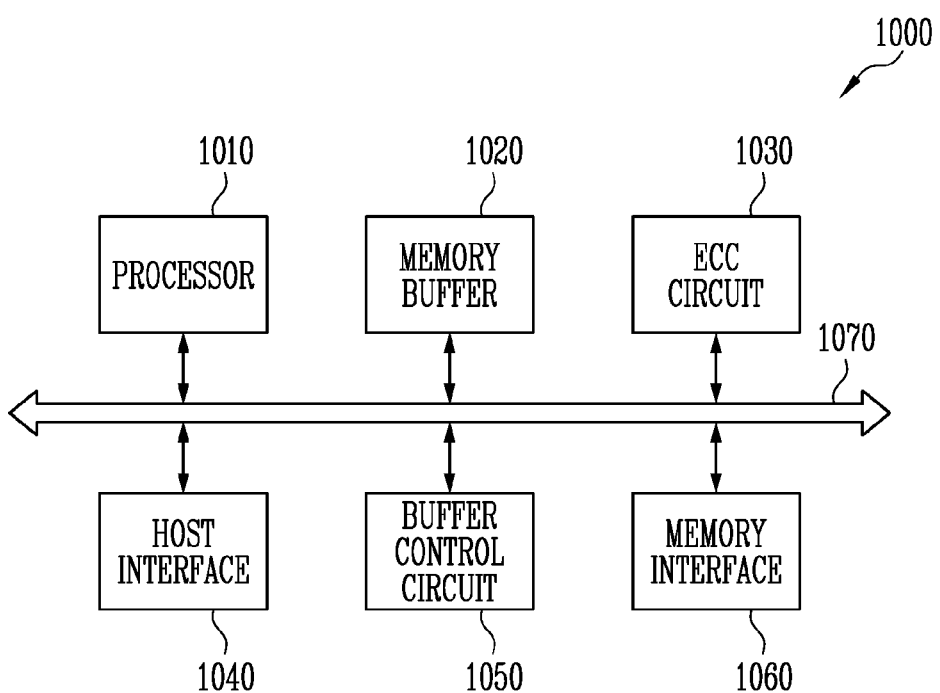
FIG. 17 is a diagram illustrating a memory controller shown in FIG. 1 in accordance with an embodiment of the present disclosure.

FIG. 17 is a diagram illustrating a memory controller 1000 according to an embodiment. The memory controller 1000 may correspond to the memory controller 200 shown in FIG. 1.

Referring to FIG. 17, the memory controller 1000 is connected to a host, e.g., the host 400 of FIG. 1, and a memory device, e.g., the memory device 100 of FIG. 1. The memory controller 1000 is configured to access the memory device 100 in response to a request received from the host 400. For example, the memory controller 1000 is configured to control read, program, erase, and background operations of the memory device 100. The memory controller 1000 is configured to provide an interface between the memory device 100 and the host 400. The memory controller 1000 is configured to drive firmware for controlling the memory device 100.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between the components of the memory controller 1000.

The processor 1010 may control overall operations of the memory controller 1000, and perform a logical operation. The processor 1010 may communicate with an external device, e.g., the host 400, through the host interface 1040, and communicate with the memory device 100 through the memory interface 1060. Also, the processor 1010 may communicate with the memory buffer 1020 through the buffer control circuit 1050. The processor 1010 may control an operation of a storage device, e.g., the storage device 50 of FIG. 1 using the memory buffer 1020 as a working memory, a cache memory, or a buffer memory.

The processor 1010 may perform a function of a flash translation layer (FTL). The processor 1010 may translate a logical block address LBA provided by the host 400 into a physical block address PBA through the FTL. The FTL may receive the logic block address LBA and translate the logic block address LPA into the physical block address PBA using a mapping table. The FTL may use one of several address mapping methods according to mapping units. Representative address mapping methods may include a page mapping method, a block mapping method, and a hybrid mapping method.

The processor 1010 is configured to randomize data received from the host 400. For example, the processor 1010 may randomize data received from the host 400 using a randomizing seed. The randomized data is provided as data to be programmed in a memory cell array of the memory device 100.

The processor 1010 may perform data randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may store data processed by the processor 1010. The memory buffer 1020 may include a Static RAM (SRAM), a Dynamic RAM (DRAM), or the like.

The ECC circuit 1030 may perform an ECC operation. The ECC circuit 1030 may perform ECC encoding on data to be written in the memory device 100. The ECC encoded data may be transferred to the memory device 100 through the memory interface 1060. The ECC circuit 1030 may perform ECC decoding on data received from the memory device 100 through the memory interface 1060. For example, the ECC circuit 1030 may be included as a component of the memory interface 1060 in the memory interface 1060.

The host interface 1040 may communicate with the host 400 under the control of the processor 1010. The host interface 1040 may communicate with the host 400, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device 100 under the control of the processor 1010. The memory interface 1060 may communicate a command, an address, and data with the memory device 100 through a channel.

Exemplarily, the memory controller 1000 may not include the memory buffer 1020 and the buffer control circuit 1050 therein. In an embodiment, the memory buffer 1020 may correspond to the buffer memory 300 of FIG. 1.

Exemplarily, the processor 1010 may control an operation of the memory controller 1000 by using codes. The processor 1010 may load the codes from a nonvolatile memory device (e.g., a read only memory (ROM)) provided in the memory controller 1000. In another example, the processor 1010 may load the codes from the memory device 100 through the memory interface 1060.

Exemplarily, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be connected to the host interface 1040, the buffer control circuit 1050, the ECC circuit 1030, and the memory interface 1060. The control bus may be connected to the host interface 1040, the processor 1010, the buffer control circuit 1050, the memory buffer 1020, and the memory interface 1060.

Figure 18:
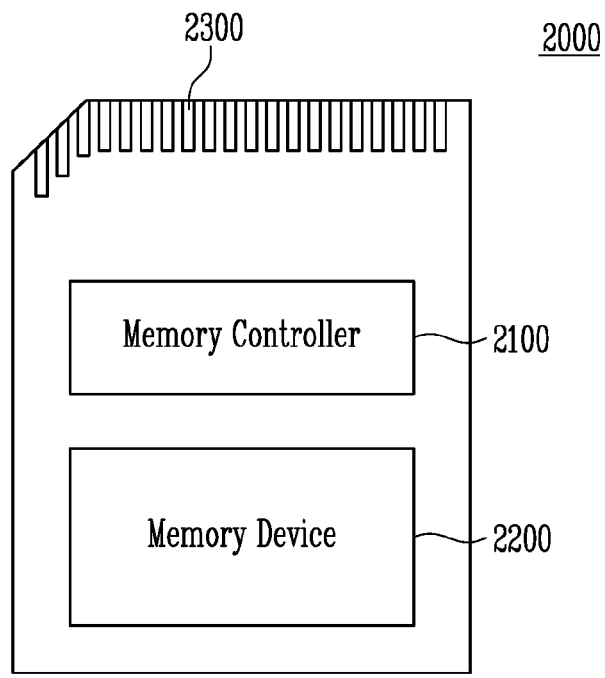
FIG. 18 is a block diagram illustrating a memory card system to which a storage device is applied in accordance with an embodiment of the present disclosure.

FIG. 18 is a block diagram illustrating a memory card system 2000 to which the storage device of FIG. 1 is applied in accordance with an embodiment of the present disclosure.

Referring to FIG. 18, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and an external device, e.g., a host. The memory controller 2100 is configured to drive firmware for controlling the memory device 2200. The memory controller 2100 may be implemented identically to the memory controller 200 described with reference to FIG. 1.

Exemplarily, the memory controller 2100 may include components such as a Random Access Memory (RAM), a processing unit, a host interface, a memory interface, and an ECC circuit.

The memory controller 2100 may communicate with the external device through the connector 2300. The memory controller 2100 may communicate with the external device (e.g., the host) according to a specific communication protocol. Exemplarily, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, NVMe, and so on.

Exemplarily, the memory device 2200 may be implemented with any of various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin Torque Transfer magnetic RAM (STT-MRAM), and so on.

The memory controller 2100 and the memory device 2200 may be integrated into a single semiconductor device, to constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), a Universal Flash Storage (UFS), or the like.

Figure 19:
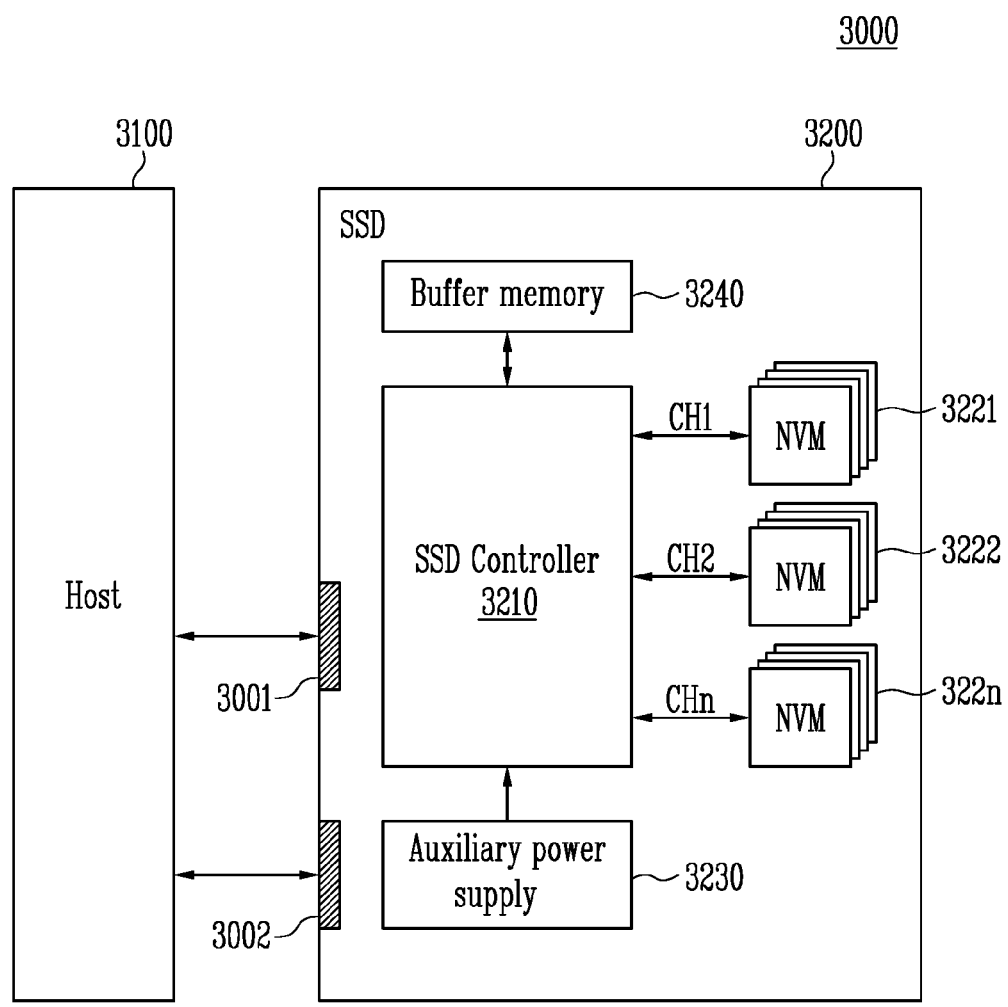
FIG. 19 is a block diagram exemplarily illustrating a Solid State Drive (SSD) system to which a storage device is applied in accordance with an embodiment of the present disclosure.

FIG. 19 is a block diagram exemplarily illustrating a Solid State Drive (SSD) system 3000 to which the storage device 50 of FIG. 1 is applied in accordance with an embodiment of the present disclosure.

Referring to FIG. 19, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of nonvolatile memories 3221 to 322n, an auxiliary power supply 3230, and a buffer memory 3240. The plurality of nonvolatile memories 3221 to 322n may be flash memories.

In an embodiment, the SSD controller 3210 may serve as the memory controller 200 described with reference to FIG. 1.

The SSD controller 3210 may control the plurality of flash memories 3221 to 322n in response to the signal SIG received from the host 3100. Exemplarily, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is connected to the host 3100 through the power connector 3002. When the supply of power from the host 3100 is not smooth, the auxiliary power supply 3230 may provide power to the SSD 3200. Exemplarily, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include any of volatile memories such as a DRAM, an SDRAM, a DDR SDRAM, an LPDDR SDRAM, and a GRAM or nonvolatile memories such as a FRAM, a ReRAM, an STT-MRAM, and a PRAM. In an embodiment, the buffer memory 3240 may correspond to the buffer memory 300 shown in FIG. 1, and the flash memories 3221 to 322n may correspond to the memory device 100 shown in FIG. 1.

Figure 20:
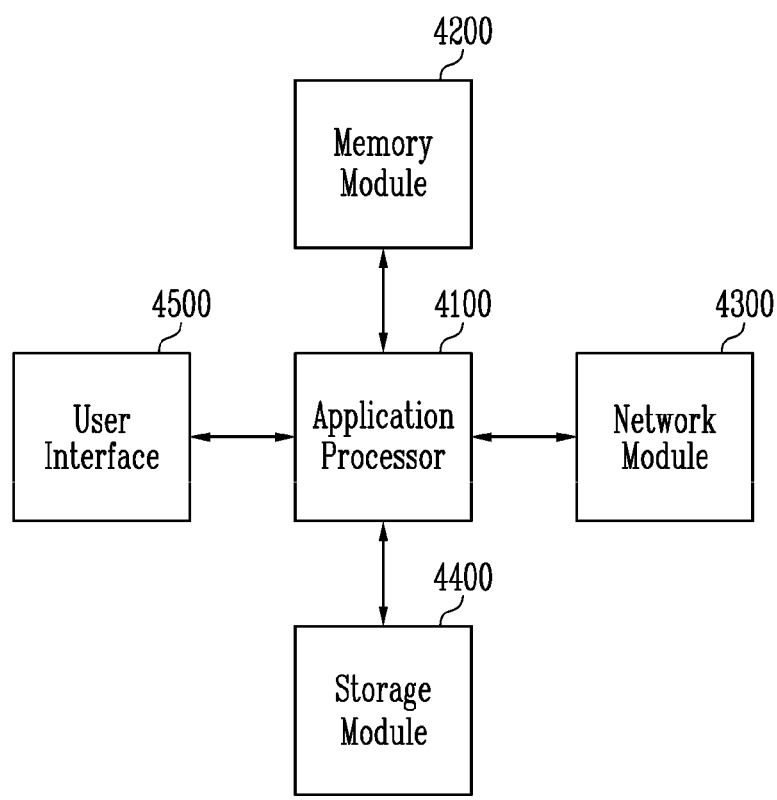
FIG. 20 is a block diagram illustrating a user system to which a storage device is applied in accordance with an embodiment of the present disclosure.

FIG. 20 is a block diagram illustrating a user system 4000 to which the storage device 50 of FIG. 1 is applied in accordance with an embodiment of the present disclosure.

Referring to FIG. 20, the user system 4000 includes an application processor 4100, a memory module 4200, a network module 4300, a storage module 4400, and a user interface 4500.

The application processor 4100 may drive the components included in the user system 4000, an operating system (OS), a user program, or the like. Exemplarily, the application processor 4100 may include controllers for controlling the components included in the user system 4000, interfaces, a graphic engine, and the like. The application processor 4100 may be provided as a System-on-Chip (SoC).

The memory module 4200 may operate as a main memory, a working memory, a buffer memory, or a cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. Exemplarily, the application processor 4100 and the memory module 4200 may be provided as one semiconductor package by being packaged together based on a Package on Package (PoP).

The network module 4300 may communicate with external devices. Exemplarily, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, Wi-Fi, or the like. Exemplarily, the network module 4300 may be included in the application processor 4100.

The storage module 4400 may store data. For example, the storage module 4400 may store data received from the application processor 4100. Alternatively, the storage module 4400 may transmit data stored therein to the application processor 4100. Exemplarily, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. Exemplarily, the storage module 4400 may be provided as a removable drive such as a memory card of the user system 4000 or an external drive.

Exemplarily, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or commands to the application processor 4100 or outputting data to an external device. Exemplarily, the user interface 4500 may include one or more of user input interfaces such as a keyboard, a keypad, a button, a touch panel, a touch screen, a touch pad, a touch ball, a camera, a microphone, a gyroscope sensor, a vibration sensor, a piezoelectric element, and so on. The user interface 4500 may include one or more of user output interfaces such as a Liquid Crystal Display (LCD), an Organic Light Emitting Diode (OLED) display device, an Active Matrix OLED (AMOLED) display device, an LED, a speaker, a monitor, and so on.

In accordance with the present disclosure, there can be provided a storage device which provides an improved buffer memory management, and an operating method of the storage device.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A storage device comprising:
   a memory device including a plurality of zones respectively corresponding to a plurality of address groups each of which includes consecutive logical addresses provided by a host;
   a buffer memory including a plurality of zone buffers respectively dedicated to the plurality of zones and a common buffer in which write data to be stored in at least two different zones among the plurality of zones is stored; and
   a memory controller configured to control the buffer memory to temporarily store target write data corresponding to a logical address provided from the host in a given zone buffer corresponding to the logical address of the target write data or in the common buffer according to whether a first size of the target write data exceeds an available storage capacity of the given zone buffer, the available storage capacity representing a size of an empty storage space of the given zone buffer in which no data is stored.

2. The storage device of claim 1, wherein the memory controller includes:
   a data size comparator configured to compare the first size of the target write data with the available storage capacity of the given zone buffer to determine whether the first size of the target write data exceeds the available storage capacity of the given zone buffer; and
   an operation controller configured to control the buffer memory to temporarily store the target write data in one of the given zone buffer corresponding to the logical address and the common buffer according to a comparison result of the data size comparator.

3. The storage device of claim 2, wherein, when the first size of the target write data is equal to or smaller than the available storage capacity of the given zone buffer, the operation controller controls the buffer memory to store the target write data in the given zone buffer.

4. The storage device of claim 2, wherein, when the first size of the target write data exceeds the available storage capacity of the given zone buffer, the operation controller controls the buffer memory to store the target write data in the common buffer.

5. The storage device of claim 2, wherein the memory controller further includes a buffer status storage configured to store zone buffer status information associated with the plurality of zone buffers and common buffer status information associated with the common buffer.

6. The storage device of claim 5, wherein the zone buffer status information includes information on a size of write data stored in each of the plurality of zone buffers, information on an available space in each of the plurality of zone buffers, and information on a logical address of the write data stored in each of the plurality of zone buffers.

7. The storage device of claim 5, wherein the common buffer status information includes information on a size of data stored in the common buffer and zone ID information representing a zone buffer corresponding to a logical address of the data stored in the common buffer.

8. The storage device of claim 5, wherein the operation controller controls the buffer memory and the memory device to perform a program operation of storing write data stored in the plurality of zone buffers and the common buffer in the plurality of zones, based on the zone buffer status information and the common buffer status information.

9. The storage device of claim 8, wherein, when a size of write data stored in one zone buffer among the plurality of zone buffers is equal to a storage capacity allocated to the one zone buffer, the operation controller controls the buffer memory and the memory device to store the write data stored in the one zone buffer in a zone corresponding to the one zone buffer among the plurality of zones, the storage capacity allocated to the one zone buffer representing a maximum storage size of the one zone buffer.

10. The storage device of claim 9, wherein after the write data stored in the one zone buffer is stored in the zone corresponding to the one zone buffer, the operation controller controls the buffer memory to move, to the one zone buffer, write data corresponding to the zone among data stored in the common buffer.

11. The storage device of claim 8, wherein, when write data stored in the common buffer has a second size equal to a predetermined size, the operation controller controls the buffer memory and the memory device to store the write data having the second size in a zone corresponding to a logical address of the write data having the second size among the plurality of zones, and
wherein the predetermined size is a size corresponding to a program unit of the memory device.

12. The storage device of claim 2, wherein, when the first size of the write data exceeds each of the available storage capacity of the zone buffer and an available storage capacity of the common buffer, the operation controller provides a standby signal to the host, and controls the buffer memory and the memory device to store the write data stored in the zone buffer and a portion of write data stored in the common buffer in a zone corresponding to the zone buffer among the plurality of zones.

13. A method for operating a memory controller that controls a memory device including a plurality of zones respectively corresponding to a plurality of groups of logical addresses to be provided by a host and a buffer memory including a plurality of zone buffers respectively dedicated to the plurality of zones and a common buffer in which write data to be stored in at least two different zones among the plurality of zones is stored, the method comprising:
receiving, from the host, a logical address and target write data corresponding to the logical address;
determining whether a size of the target write data exceeds an available storage capacity of a given zone buffer, corresponding to the logical address, among the plurality of zone buffers, the available storage capacity representing a size of an empty storage space of the given zone buffer in which no data is stored;
controlling the buffer memory to store the target write data in the given zone buffer or in the common buffer in response to a result of the determining.

14. The method of claim 13, further comprising:
storing, in the memory controller, zone buffer available space information representing whether an available space capable of storing additional write data exists in each of the plurality of zone buffers, information on a size of write data stored in each of the plurality of zone buffers, and information on a logical address of the write data stored in each of the plurality of zone buffers; and
storing, in the memory controller, information on a size of data stored in the common buffer and zone ID information representing a zone buffer corresponding to a logical address of the data stored in the common buffer.

15. The method of claim 14, further comprising controlling the buffer memory and the memory device to store the write data stored in a zone buffer in a zone corresponding to the zone buffer based on the zone buffer available space information and the information on the size of the write data stored in each of the plurality of zone buffers.

16. The method of claim 15, further comprising controlling the buffer memory to move, to the zone buffer, write data corresponding to the zone corresponding to the zone buffer and stored in the common buffer, after the write data stored in the zone buffer is stored in the zone corresponding to the zone buffer.

17. The method of claim 14, further comprising controlling the buffer memory and the memory device to store write data stored in the common buffer in a zone corresponding to a logical address of the write data stored in the common buffer among the plurality of zones, based on the information on the size of the data stored in the common buffer and the zone ID information.

18. The method of claim 13, further comprising outputting a standby signal to the host according to whether the size of the target write data exceeds each of the available storage capacity of the given zone buffer and an available storage capacity of the common buffer.

19. The method of claim 13, wherein the memory controller controls the buffer memory to store the target write data in the given zone buffer when the size of the target write data is equal to or smaller than the available storage capacity of the given zone buffer and to store the target write data in the common buffer when the size of the target write data exceeds the available storage capacity of the given zone buffer.

20. A storage device comprising:
a memory device including a plurality of zones respectively corresponding to a plurality of logical address groups, each of which corresponds to consecutive logical addresses provided by a host;
a plurality of zone buffers respectively dedicated to the plurality of zones, the plurality of zone buffers respectively storing data corresponding to the plurality of logical address groups;
a common buffer including write data corresponding to two or more zone buffers among the plurality of zone buffers; and
a memory controller configured to control the plurality of zone buffers to store write data corresponding to a logical address provided by the host in a zone buffer corresponding to the logical address among the plurality of zone buffers,
wherein, when target write data having a size exceeding an available storage capacity of a corresponding zone buffer among the plurality of zone buffers is input from the host, the memory controller controls the common buffer to store the target write data in the common buffer.

* * * * *